US008272790B2

(12) United States Patent
Belsan et al.

(10) Patent No.: US 8,272,790 B2
(45) Date of Patent: Sep. 25, 2012

(54) OUTDOOR TRANSCEIVER CONNECTOR

(75) Inventors: Michael Belsan, Worth, IL (US); Anh Ngoc Nguyen, Carrollton, TX (US); Darijus Baltrukonis, Naperville, IL (US)

(73) Assignees: Amphenol Fiber Optics, Lisle, IL (US); Amphenol Corporation, Wallingford Center, CT (US)

( * ) Notice: Subject to any disclaimer, the term of this patent is extended or adjusted under 35 U.S.C. 154(b) by 379 days.

(21) Appl. No.: 12/625,387

(22) Filed: Nov. 24, 2009

(65) Prior Publication Data
US 2011/0123157 A1 May 26, 2011

(51) Int. Cl.
G02B 6/38 (2006.01)
G02B 6/36 (2006.01)
H01R 13/52 (2006.01)
H04B 10/00 (2006.01)

(52) U.S. Cl. ............ 385/75; 385/100; 385/101; 385/53; 385/55; 385/56; 385/62; 385/88; 439/523; 439/577; 398/135; 398/138; 398/139

(58) Field of Classification Search .................... 385/53, 385/55, 56, 60, 62, 75, 76, 77, 78, 81, 88, 385/89, 92, 139, 100, 101; 439/577, 523; 398/135, 138, 139
See application file for complete search history.

(56) References Cited

U.S. PATENT DOCUMENTS

| 6,062,739 A * | 5/2000 | Blake et al. ............ 385/76 |
| 6,334,784 B1 | 1/2002 | Howard |
| 6,485,322 B1 | 11/2002 | Branch et al. |
| 6,517,382 B2 | 2/2003 | Flickinger et al. |
| 6,565,264 B1 | 5/2003 | Johnson et al. |
| 6,769,814 B2 | 8/2004 | Kiani et al. |

(Continued)

FOREIGN PATENT DOCUMENTS
EP 1315991 B1 8/2007

OTHER PUBLICATIONS

JDSU Communications Modules & Subsystems, "OC-12 Small Form Factor (SFF) Transceiver, CF2 Series", published marketing materials found at http://www.jdsu.com, dated Aug. 2006, 6 pages.
Molex Sealed SFP Assemblies Integrated Optical and Electrical Receptacles, published marketing materials found at http://www.molex.com, dated Feb. 2007, 2 pages.

(Continued)

Primary Examiner — Brian Healy
(74) Attorney, Agent, or Firm — Wolf, Greenfield & Sacks, P.C.

(57) ABSTRACT

A cable connector assembly for outdoor connection to transceivers. Electrical connection between a component of the cable connector assembly and a connector inside an electronic assembly to which the cable connector assembly is attached is made through a force generated by a biasing member within the cable connector assembly. The biasing member may generate the force as the cable connector assembly is attached to an adapter. Once the cable connector assembly is disengaged from the adapter, the force is released, allowing easy removal of the cable connector assembly, without the need to release a latch. In an environmentally sealed connector in which access to a release mechanism may be restricted, such a structure provides ease of use for either electrical or optical connectors. For optical cable connector assemblies, the optical cable connector may be coupled to a transceiver such that biasing force generated within the cable connector assembly holds the transceiver in a mating relationship with a connector within an electronic assembly but can be easily removed.

40 Claims, 17 Drawing Sheets

U.S. PATENT DOCUMENTS

| | | | |
|---|---|---|---|
| 6,854,894 | B1 | 2/2005 | Yunker et al. |
| 7,281,856 | B2 | 10/2007 | Grzegorzewska et al. |
| 7,290,941 | B2 | 11/2007 | Kiani et al. |
| 7,591,595 | B2 * | 9/2009 | Lu et al. ............ 385/60 |
| RE42,522 | E * | 7/2011 | Zimmel et al. ............ 385/55 |
| 2004/0156595 | A1 | 8/2004 | Stockhaus et al. |
| 2006/0045428 | A1 * | 3/2006 | Theuerkorn et al. ............ 385/53 |
| 2007/0036489 | A1 | 2/2007 | Grzegorzewska et al. |
| 2011/0123157 | A1 * | 5/2011 | Belsan et al. ............ 385/75 |

OTHER PUBLICATIONS

JDSU Communications Modules & Subsystems, "OC-12 SFPT Transceiver (Multirate, 1310 nm and 1550 nm), CT2 Series", published marketing materials found at http://www.jdsu.com, dated Sep. 2006, 8 pages.

3 images of JDS transceiver cages, dated Sep. 2005, 3 pages.

International Search Report for PCT/US2010/057935, dated Feb. 11, 2011.

* cited by examiner

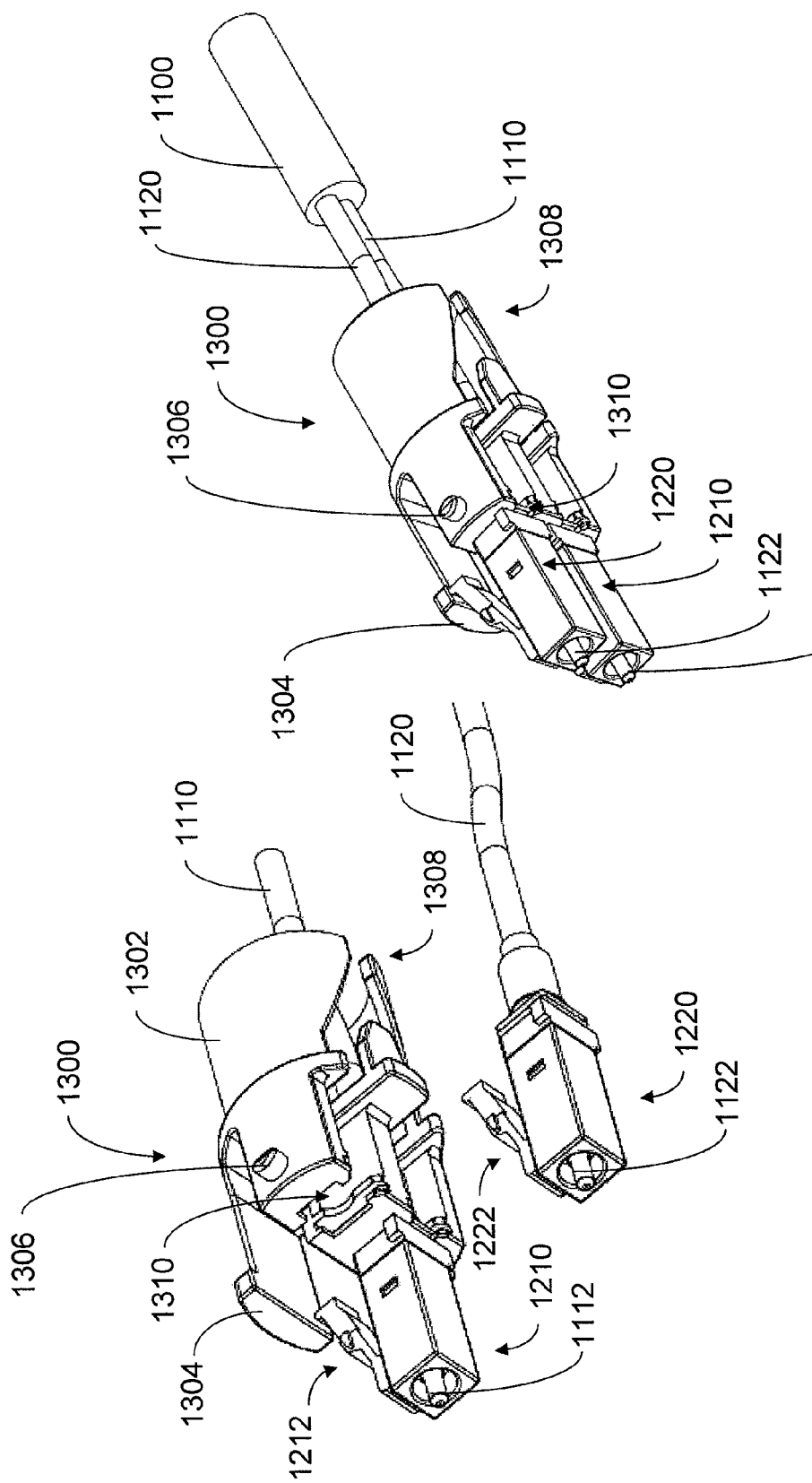

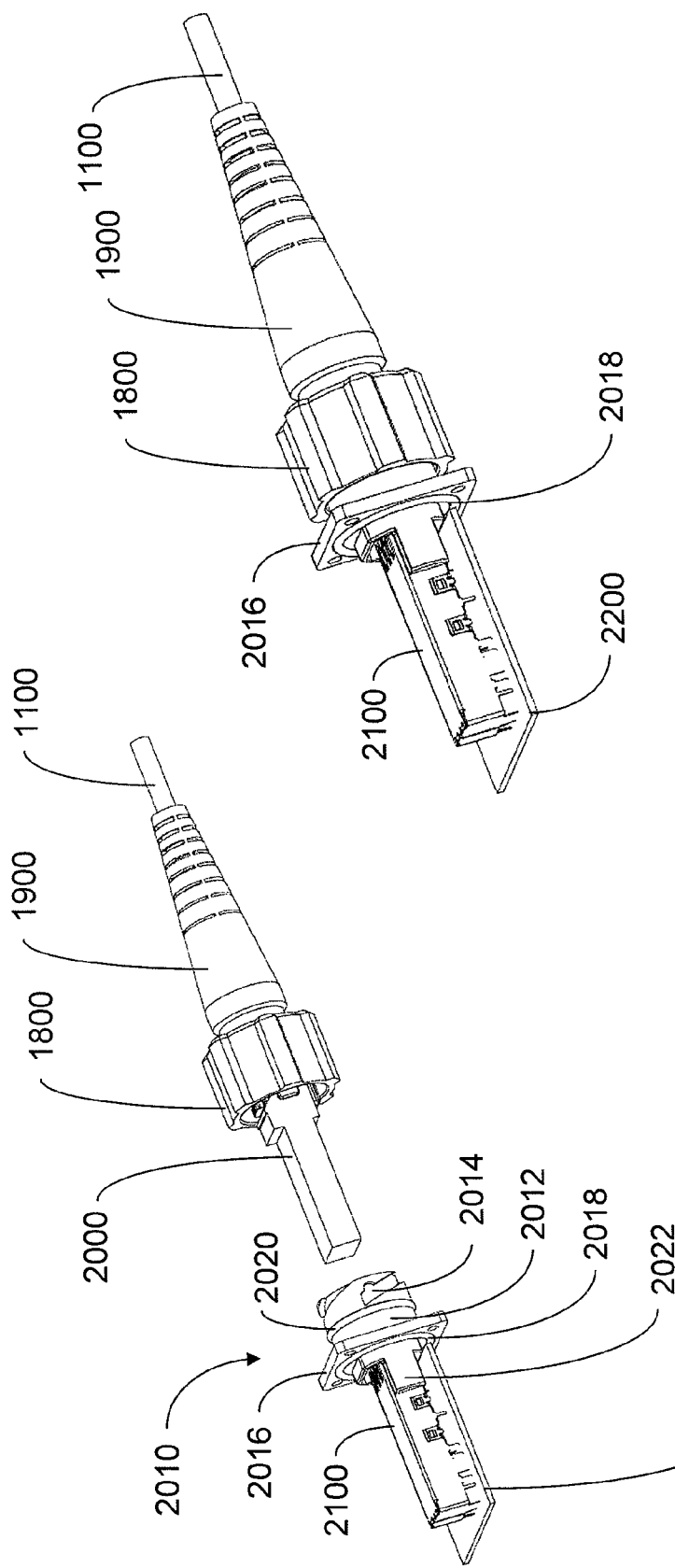

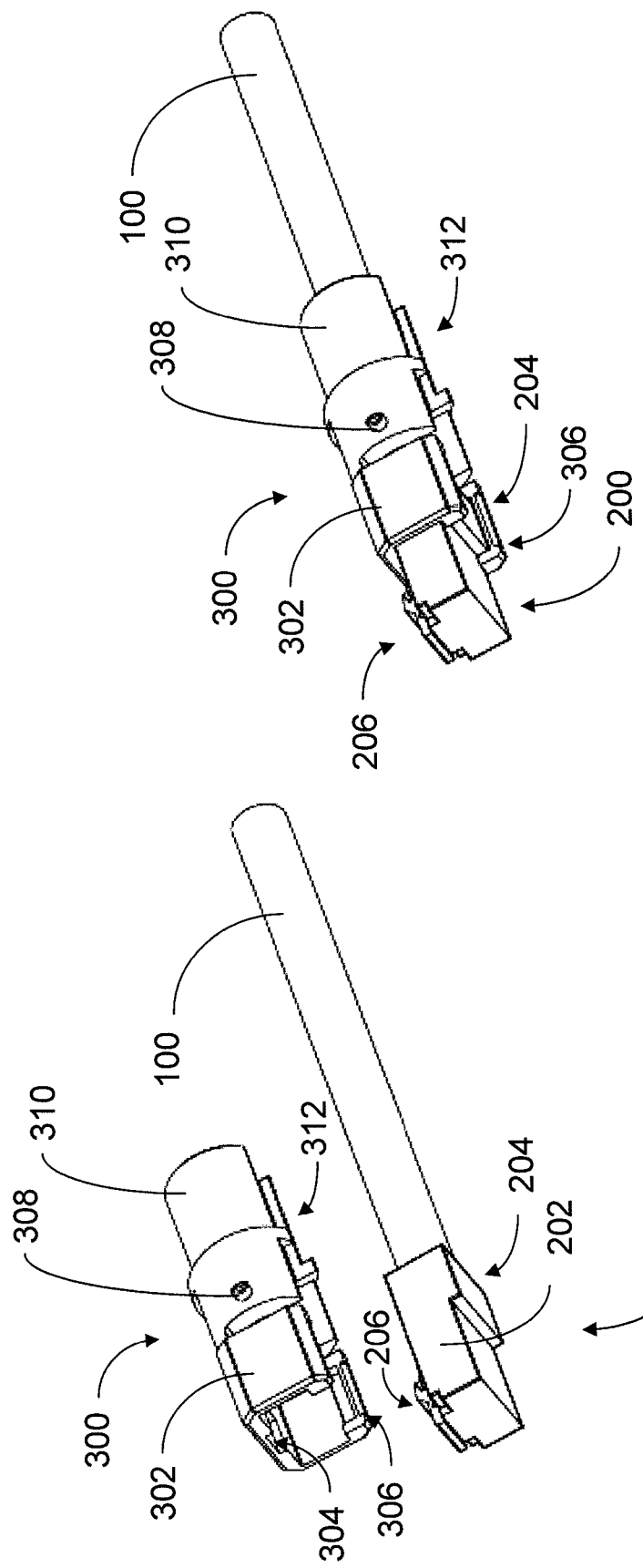

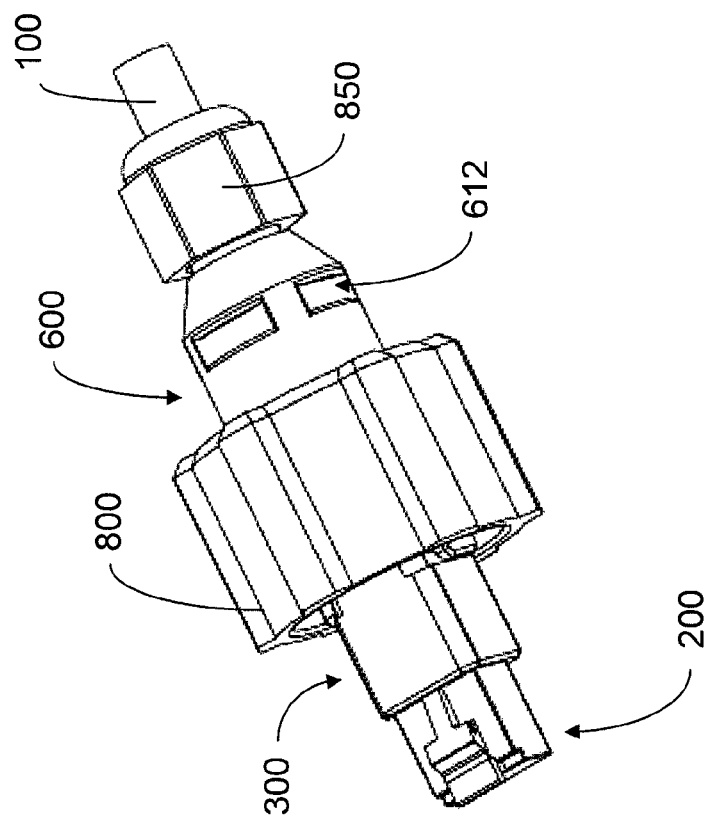
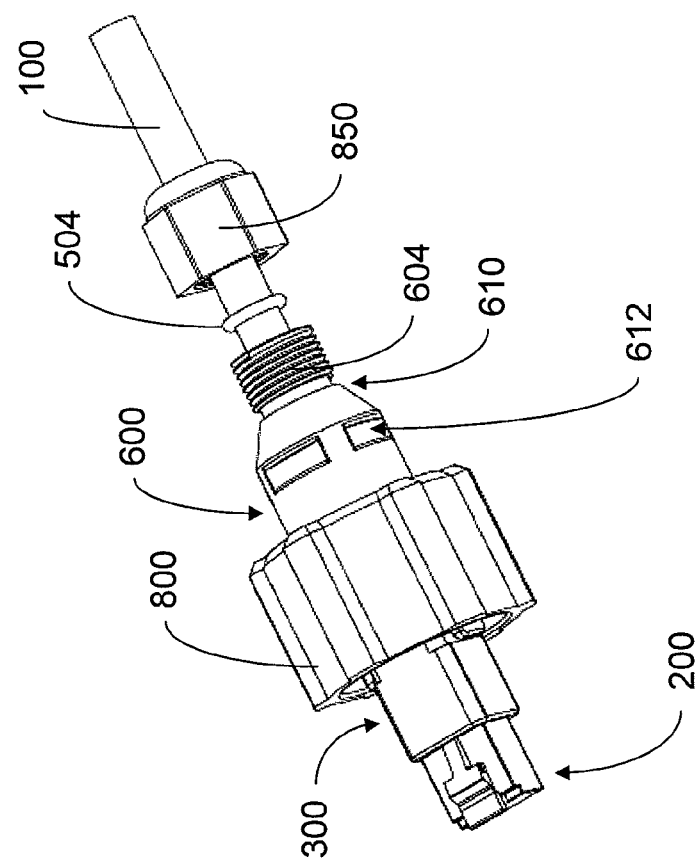

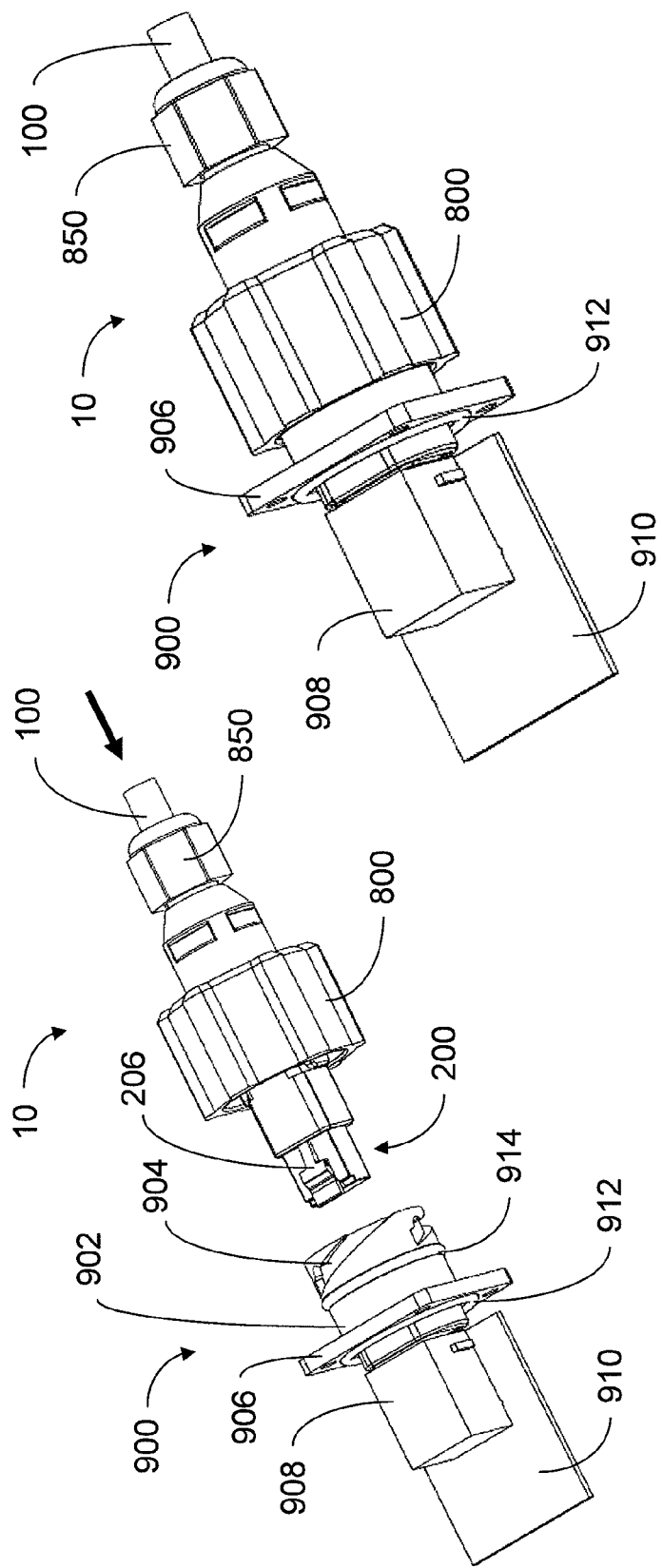

OUTDOOR TRANSCEIVER CONNECTOR

BACKGROUND OF INVENTION

1. Field of Invention

Aspects described herein relate generally to cable connectors, including those for fiber optic transceivers, and more specifically to environmentally sealed connections for cables.

2. Discussion of Related Art

Modern life is full of devices that process information in digital form. Computers share digital information over the Internet or other computer networks. Information, such as radio and television signals, that in the past was communicated as analog signals is now frequently digitized and communicated over networks. For example, many homes have a high speed digital connection to a cable company or other service provider.

The increased use of digital information has created a need for reliable interconnection systems that can connect devices and networks that generate or consume digital information. One form of interconnection system employs optical fiber for transmission of digital information. Large amounts of information can be encoded as a light signal, which can then be transmitted over a relatively long distance. Often, optical fibers are used to provide links between electronic devices that are separated by a relatively large distance.

Such systems frequently employ optoelectronic transceivers, which can convert electrical signals to light signals, and vice versa. To support interconnection of electronic devices, which may be made at different times by different parties, standards have developed for both optoelectronic transceivers and connectors that can mate to them. One such standard defines a small form factor pluggable (SFP) optoelectronic transceiver.

Such an optoelectronic transceiver is designed to receive, at one end, an optical connection to an optical fiber, and at another end, make electrical connections to an electrical connector on a printed circuit board. Such a pluggable transceiver may be arranged in a housing or cage that is attached to a printed circuit board and surrounds the electrical connector to block stray electrical signals and also to support the transceiver. By latching the transceiver in the cage, the transceiver may also be secured to ensure that it makes a good connection to the electrical connector.

Because fiber optics may be used with electronic devices that are widely separated, in some instances, connections to the optical fibers are made in outdoor environments where dust, moisture/humidity or other contaminants can degrade overall performance and/or damage the connector assembly. In such environments, standard optical connectors may require further design considerations so as to prevent significant performance degradation. For example, standard LC optical connectors may not provide sufficient inherent protection from the weather or other environmental factors. A similar limitation exists for electrical connectors, such as RJ-45 connectors.

Currently available connector assemblies that are designed for extremely harsh environments, particularly military and aerospace applications, may not be economical for applications that entail a large number of connections, such as fiber optic distribution network networks. However, fiber optic distribution networks are becoming more common, for example as information in digital form is delivered directly to homes using optical fibers. For such applications, it is known to integrate a fiber optic cable connector in an assembly that attaches to an adapter. The connector assembly and adapter are shaped to create an enclosure within which the fiber optic connector mates to the transceiver.

SUMMARY OF INVENTION

The inventors have recognized and appreciated that it would be desirable to provide economical, easy to use, environmentally sealed, connection systems for optical or electrical cable connectors. In one aspect, the connection system may involve optical fiber connectors that mate with pluggable transceivers. An improved interconnection system may be provided with a compliant mounting for the connector within a cable connector assembly terminating a cable. The connector may be biased, such as with a spring, away from other components of the cable connector assembly. When the cable connector assembly is attached to an adapter on a panel of an electronic assembly, force generated by a biasing member presses electrical contacts of a component coupled to the cable connector assembly against an electrical connector within the electronic assembly. For an electrical cable connector assembly, the electrical contacts may be on the electrical connector in the cable connector assembly. For an optical cable connector assembly, the force may be coupled through the optical fiber connector to a transceiver, or other component, within the electronic assembly. The biasing force may provide a mating force sufficient to ensure adequate electrical connection between the transceiver and an electrical connector within the electronic assembly. However, upon disconnection of the cable assembly, the transceiver may be readily removed.

For a cable connector assembly including an electrical connector, such as an RJ-45 plug-type connector, the biasing force may be applied directly from the electrical connector to a jack-type electrical connector within the electronic assembly. The force may ensure that there is an adequate electrical connection between the plug and jack, even if the electrical connector in the cable connector assembly is not latched to the connector within the electronic assembly. Thus, regardless of the form of connector in the cable connector assembly, appropriate mating can be made when the cable connector assembly is attached to an adapter, but the cable connector assembly can be removed without manipulating latches or other release mechanisms inside the cable connector assembly, which may be difficult to access in an environmentally sealed connector.

In some aspects, an optical fiber connector assembly may include an optical connector that provides for communication between a transceiver and an optical fiber. A coupling member, such as a coupling nut, associated with the optical fiber cable connector assembly may be adapted to engage with an electronic assembly, for example, through rotation. A biasing member, such as a spring, may be mounted to a housing that is disposed between the optical connector and the coupling member such that when the optical fiber connector and the coupling member engage with the electronic assembly, the spring is compressed, holding a transceiver in place in the electronic assembly. Once the optical fiber connector assembly is disengaged from the electronic assembly, the spring force is released and the receiver may be removed. In some instances, environmental seals (e.g., provided by o-rings) may be utilized between members of the optical fiber connector assembly for providing more rugged connections. Similar components may be provided for cable connectors used to terminate cables carrying electrical signals.

In an illustrative embodiment, a connector assembly configured to connect to an adapter is provided. The assembly includes a connector connected to a cable; a coupling member having a region that is adapted to engage with the adapter; and a biasing element coupled to the connector and the coupling member; wherein the region of the coupling member is shaped such that engagement of the coupling member with the adapter compresses the biasing element.

In another illustrative embodiment, a connector assembly is provided. The assembly includes a cable adapted to transmit signals; a front housing having a back attachment portion; a connector attached to the cable and coupled to the front housing; a biasing element coupled to the front housing; a rear housing having an front attachment portion slidably coupled to the back attachment portion of the front housing; a first sealing member and a second sealing member disposed adjacent to the rear housing to provide an environmental seal about the rear housing; a coupling member having a region that is adapted to engage with an electronic assembly; and wherein the biasing element is mounted to bias the front housing away from the rear housing In a further illustrative embodiment, a cage for holding a transceiver having a protruding latching feature is provided. The cage includes a cage body having a plurality of conductive walls adjacent a transceiver opening shaped to receive the transceiver, the plurality of walls comprising a top wall, a bottom wall, a back wall and two side walls; a bottom attachment region for attaching the cage body to a circuit board, the bottom attachment region including a plurality of attachment posts, each post extending from a wall of the plurality of walls; an electronic assembly attachment region for attaching the cage body to the electronic assembly wherein the transceiver opening has a width $w_1$ ranging between about 10 mm and about 20 mm and a height $h_1$ that ranges between about 6 mm and about 12 mm; and a cut out in the bottom wall shaped and positioned to align with the protruding latching feature.

In another illustrative embodiment, a method of mating an optical fiber connector assembly with an electronic assembly is provided. The method includes inserting an optical transceiver into a panel adapter; coupling an optical connector of an optical fiber connector assembly to the optical transceiver; engaging a coupling member of the optical fiber connector assembly to the adapter; and rotating the coupling member to generate a force that is transmitted through the optical connector to press the optical transceiver into mating engagement with an electrical connection member, the force being sufficient to compress a spring mounted to the optical fiber connector assembly.

Other advantages and novel features of the present invention will become apparent from the following detailed description of various non-limiting embodiments of the invention when considered in conjunction with the accompanying figures and from the claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a perspective view of a front housing during assembly of an embodiment providing a duplex connector in accordance with the present invention;

FIG. 2B is a perspective view of the embodiment of FIG. 2A with two connectors assembled to the front housing of the duplex connector;

FIG. 6A is a perspective view of an embodiment of a cable assembly with a transceiver attached prior to attachment to an adapter in accordance with the present invention;

FIG. 6B is a perspective view of the embodiment of FIG. 6A with the fiber optic cable and transceiver assembly engaged with the adapter;

FIG. 9A is a perspective view of an embodiment of an electrical cable and a connector prior to assembly with a front housing in accordance with the present invention;

FIG. 9B is a perspective view of the embodiment of FIG. 9A with the front housing assembled to the electrical cable and connector;

FIG. 11B is a perspective view of the embodiment of FIG. 11A with the coupling nut pushed up against the rear housing and prior to assembly with an o-ring and an end nut in accordance with the present invention;

FIG. 11C is a perspective view of the embodiment of FIG. 11B with the end nut attached to the rear housing;

FIG. 12A illustrates a perspective view of the embodiment of FIG. 11C prior to engagement with an adapter in accordance with the present invention; and FIG. 12B is a perspective view of the embodiment of FIG. 12A with the connector engaged with the electronic assembly.

DETAILED DESCRIPTION

Figure 1A:
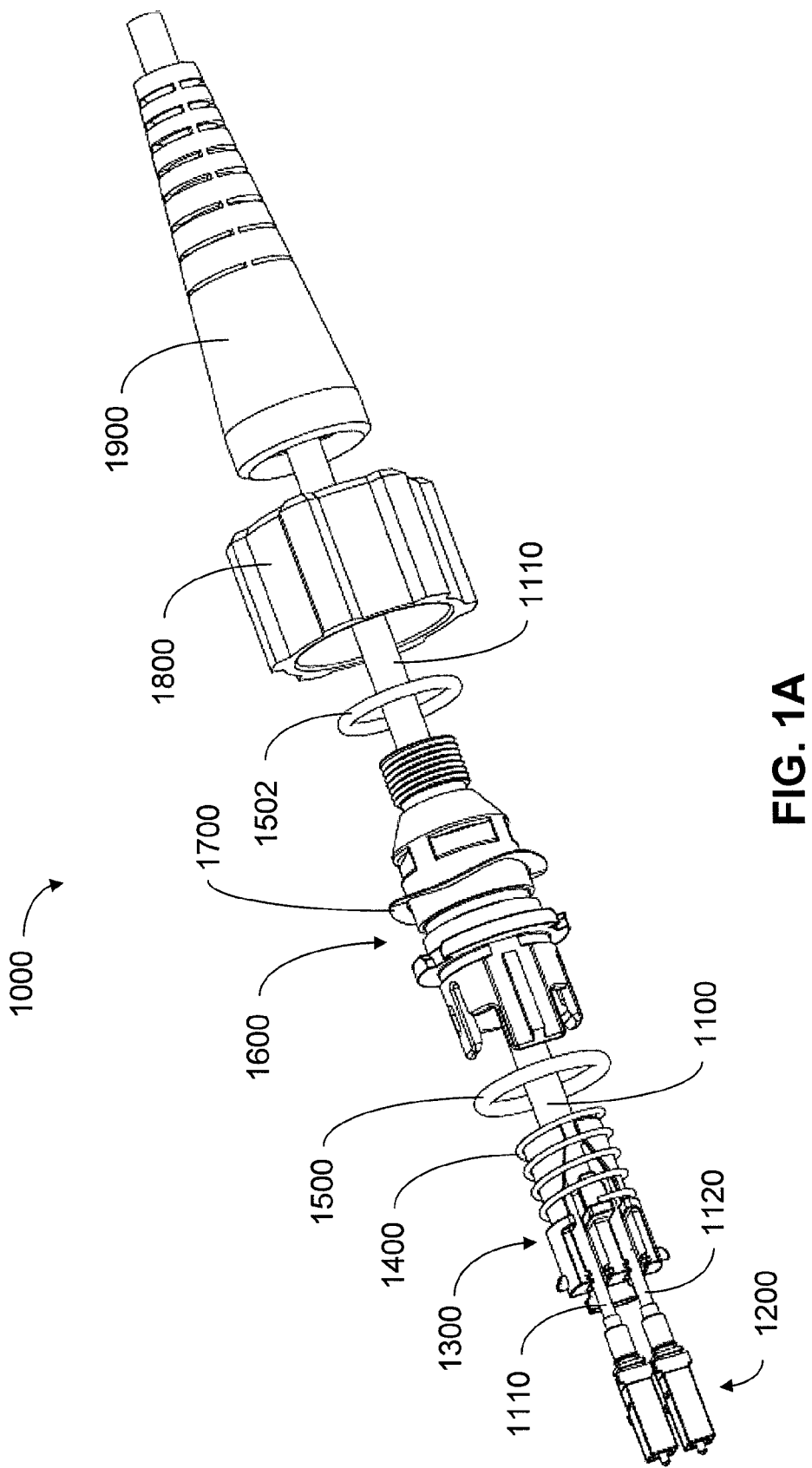
FIG. 1A is a perspective view of an exemplary embodiment of an outdoor fiber optic assembly in accordance with the present invention.

The inventors have recognized and appreciated that an improved cable connector assembly may be provided that is particularly useful in a distribution network, such as one distributing digital information to homes or other geographically dispersed locations. The connector assembly is suited for use in networks in which an interface between an optical or electrical network and an electronic assembly is made outdoors or in other settings in which environmental protection is desired.

Ease of use may be provided by generating within the cable connector assembly a force when the cable connector assembly is attached to an adapter of an electronic assembly, such as when the cable connector assembly is connected to an exterior panel of an electronic assembly. The force may be sufficient to ensure a reliable electrical connection between an electrical connector within the electronic assembly and a component that is coupled to the cable connector assembly. For a cable connector assembly containing an electrical connector, that force may be between a plug-type electrical connector of the cable connector assembly and an receptacle-type electrical connector inside the electronic assembly. For a cable connector assembly containing an optical connector, that force may be between an optical transceiver attached to an optical connector of the cable connector assembly and the electrical connector inside the electronic assembly.

Regardless of the type of connector in the cable connector assembly, when the cable connector assembly is detached from the adapter, the force is released, allowing the pieces to be easily separated. For example, to remove the transceiver, the optical cable connector assembly may be disconnected from the adapter, which removes the force on the transceiver. The transceiver then may be easily removed. In some embodiments, the transceiver may be latched to the optical connector such that when the cable connector assembly is removed, the transceiver is withdrawn through the adapter. In this way, the transceiver may be removed without requiring any special tools and without requiring a user to have special dexterity to access a release mechanism within the electronic assembly. Similarly, in an electrical connector, when a plug-type connector in the cable connector assembly is held in a receptacle within the electronic assembly by biasing force generated when the cable connector assembly is attached to an adapter, releasing the cable connector assembly from the adapted allows the plug to be withdrawn from the adapter without manipulation of a latching mechanism or release mechanism.

In some embodiments, the force for pressing a component coupled to the cable connector assembly into an electrical connector may be provided through a biasing element, such as a spring or other suitable component that generates a force when compressed. The biasing element may bias the optical or electrical connector within the cable connector assembly away from other components of the assembly. For example, the cable connector assembly may include a housing with a front portion and a back portion. These portions may be slidably coupled such that the front housing may move relative to the rear housing. A biasing element may be mounted between these pieces to bias the front housing away from the rear housing.

The connector assembly may be constructed such that the rear housing is coupled to a coupling member that engages the cable connector assembly to the adapter. The coupling member may have a region shaped such that, as the coupling member is tightened to the adapter, the coupling member, and the rear housing, is drawn towards the adapter. This motion of the rear housing toward the adapter may compress the biasing element, generating the required force on the front housing and the connector attached to the front housing.

Such a cable connector assembly may be used in connection with a component inside the electronic assembly that slidably receives a member coupled to the cable connector assembly without latching. In the case of an optical cable connector assembly, the component inside the electronic assembly may be a cage adapted to slidably receive the transceiver. The cage and/or the transceiver may be modified relative to a standard cage/transceiver configuration such that the transceiver does not latch to the cage. In some embodiments, a standard transceiver, with a projecting member may be used with a cage that includes a cut out where a standard cage includes a latching member to engage the projection. Similarly, in the case of an electrical cable connector assembly, the component in the electronic assembly may be a jack-type electrical connector adapted to slidably receive a plug-type connector from the cable connector assembly without latching. Either the plug or the jack may be modified relative to standard components to preclude latching. Alternatively, the plug may be held within the cable connector assembly such that a standard latching member is held in an unlatched position.

In the following exemplary embodiments, an optical cable connector assembly as an example of a cable connector assembly. In such embodiments, optical fiber connector assemblies are contemplated for connecting optical fiber connectors with pluggable transceivers and adapters so that optical signals from a fiber optic cable may be converted to appropriate electrical signals and coupled to a printed circuit board through the electrical connector. Similarly, optical fiber connector assemblies may also provide the ability for electric signals from a printed circuit board to be suitably converted to optical signals for travel through optical fibers. In some cases, an optical connector may be attached to a fiber optic cable and provide for communication between the fiber optic cable and an appropriate transceiver. The optical connector may be attached to a housing that has a spring mounted on a portion of the housing. A portion of the housing may also have a flange to assist in providing environmental protection. In some embodiments, the flange may engage with a coupling nut that may be rotatable upon installation of the optical fiber connector assembly into an adapter. O-rings may be disposed adjacent to the flange so as to provide a suitable environmental seal about the housing. A portion of the coupling nut may be adapted to engage with a portion of an adapter such that when the coupling nut is engaged with the adapter, through a twist lock or other suitable mechanism, the spring is compressed. When the coupling nut is released from the adapter, the bias from the compressed spring is released, providing force that pushes the optical fiber connector assembly and coupling nut away from the adapter. It can be appreciated that other coupling members may be contemplated in addition to a coupling nut. For example, a coupling member having a latch or lock mechanism may be used to compress the spring of the optical fiber connector assembly upon engagement with an adapter of the electronic assembly.

Figure 1B:
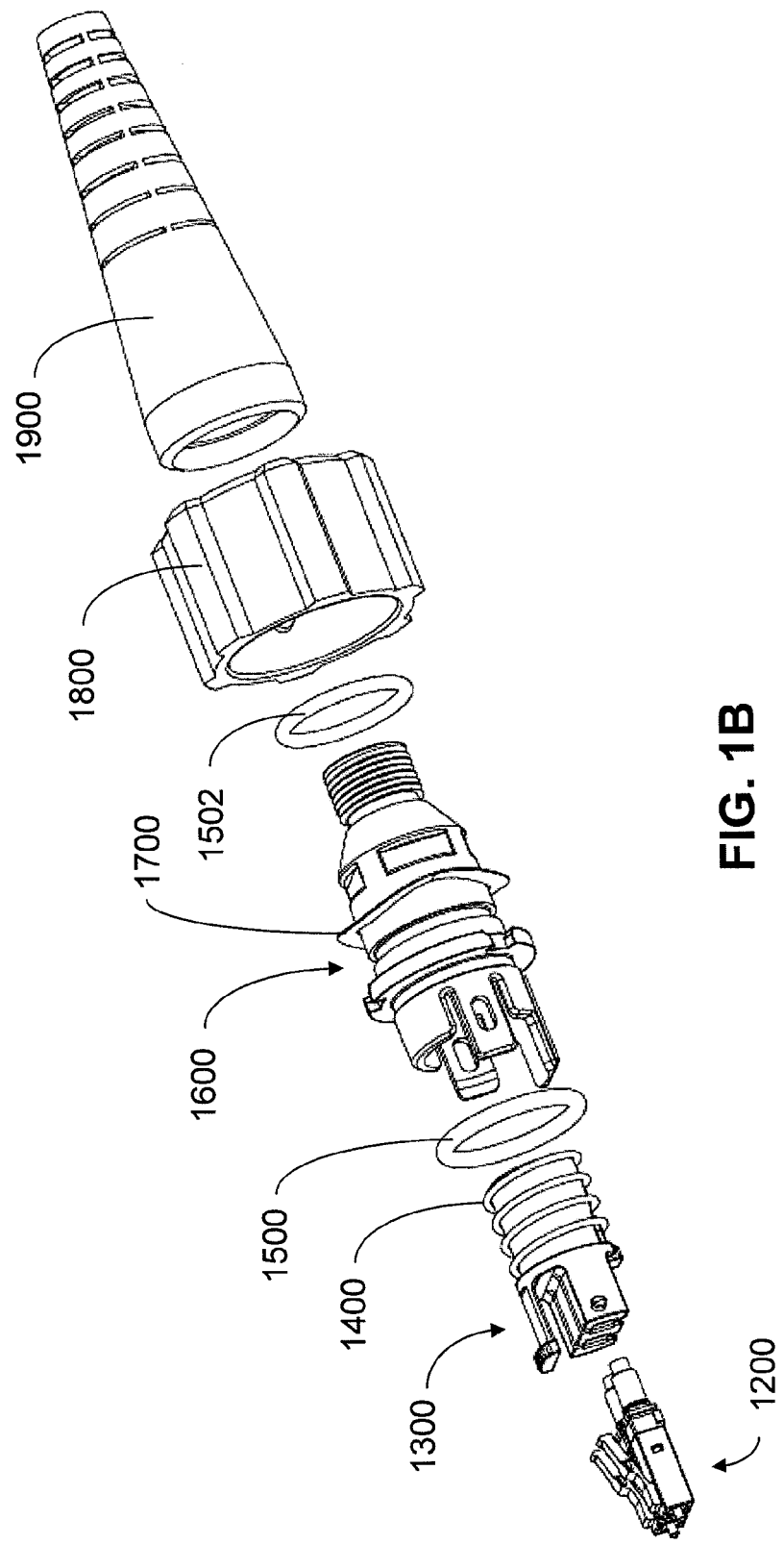
FIG. 1B is a perspective view of the embodiment of FIG. 1A, rotated 90 degrees and shown without the fiber optic cable.

FIGS. 1A and 1B show an illustrative embodiment of an optical fiber connector assembly 1000 prior to assembly and connection with a transceiver and electronic assembly. In this embodiment, a force generated on optical connectors 1200 within an optical fiber cable connector assembly 1000 is used to press a transceiver into a panel connector assembly of an electronic assembly. In this embodiment, the optical connector is a duplex connector assembly. Any suitable number of connectors or fibers may be used in optical fiber cable connector assemblies and techniques described herein. For example, the optical connector may be a single or a triple connector assembly.

FIG. 1A depicts the assembly including a fiber optic cable 1100 and FIG. 1B shows a different view of the assembly without fiber optic cable 1100. The optical fiber cable connector assembly 1000 includes a fiber optic cable 1100 that is separated into optical fibers. In the embodiment illustrated, the connector for the cable connector assembly is a duplex optical connector 1200 attached to the optical fibers. The connectors is mounted in a front housing 1300 that is slidably attached to a rear housing 1600. A biasing force between the front housing 1300 and rear housing 1600 is provided by a biasing member, here illustrated as spring 1400 mounted on the front housing. An environmental seal is provided when the optical fiber cable connector assembly 1000 is attached to an adapter through sealing members, here illustrated as a first o-ring 1500, and a second o-ring 1502. A nut 1800 is provided for attaching the cable connector assembly 1000 to an adapter. Nut 1800 is rotatably mounted around rear housing 1600 but is adapted to engage features on rear housing 1600 to pull it towards the adapter when nut 1800 is tightened. Wave washer 1700 is included for engaging nut 1800 to an adapter for certain types of attachment mechanisms, as described below.

In the embodiment illustrated, two optical fibers are separated from fiber optic cable 1100, first optical fiber 1110, and second optical fiber 1120. The duplex optical connector 1200 may be any suitable optical fiber connector useful for transferring optical signals to a transceiver. As illustrated, duplex optical connector 1200 is formed from two LC connectors, however, it can be appreciated that any suitable connector or connectors may be employed. Examples of connectors that may be used in embodiments described include, but are not limited to Avio, ADT-UNI, DMI, E-2000, EC, ESCON, F-3000, FC, Fibergate, FSMA, LuxCis, LX-5, MIC, MPO/MTP, MT, MT-RJ, MU, NEC D4, Opti-Jack, SC, SMA 905/906, SMC, ST/BFOC, TOSLINK, VF-45, and V-PIN connectors.

These components illustrated in FIGS. 1A and 1B may be manufactured and assembled using techniques similar to those described below in connection with embodiments described below. Though, front housing 1300 here is shown to be shaped to receive two optical connectors and to contain passageways for two optical fibers. In addition, the embodiment illustrated in FIG. 1A includes a boot 1900. The boot may be made of flexible material and provide strain relief on cable 1100 using materials and attachment techniques as are known in the art. Here, boot 1900 is attached to rear housing 1600.

FIGS. 2A and 2B show in greater detail attachment of a duplex optical fiber cable connector attached in a front housing. In this embodiment, a housing extension 1304 is used as a trigger to facilitate simultaneous release of both connectors from a transceiver. As illustrated, first optical fiber 1110 and second optical fiber 1120 are separated from fiber optic cable 1100. To the ends of these fibers are attached duplex connector 1200, including first sub-connector 1210 and second sub-connector 1220, respectively. Ferrules 1112 and 1122 are also shown to incorporate ends of the first and second optical fibers 1110 and 1120, respectively. Optical signals that travel through fiber optic cable 1100 and first and second optical fibers 1110 and 1120 eventually travel along ferrules 1112 and 1122 to and from an appropriate transceiver. FIGS. 2A and 2B also depict assembly of optical fibers and sub-connectors to a front housing 1300. FIG. 2A shows the front housing 1300 having been attached to first optical fiber 1110 and first sub-connector 1210 and prior to attachment of second optical fiber 1120 and second sub-connector 1220. FIG. 2B depicts the front housing 1300 having been assembled with the optical fibers 1110 and 1120 and sub-connectors 1210 and 1220. FIG. 2B also shows an illustration of fiber optic cable 1100 split into two separate optical fibers.

Sub-connectors 1210 and 1220 include first and second sub-connector latches 1212 and 1222 which provide a method for attachment of the duplex connector to a transceiver through the sub-connectors. Upon mating of the transceiver to the sub-connectors, the latches 1212 and 1222 provide a snap fit attachment. When the transceiver is to be disconnected from the sub-connectors, upper portions of the latches 1212 and 1222 may be pressed down toward the sub-connectors so that the sub-connectors are released from the transceiver. It can be appreciated that connectors and sub-connectors may include any shape and/or feature so as to appropriately engage with a transceiver. In embodiments in which it is desired for the transceiver to remain within the electronic assembly when cable connector assembly is removed, no latching may be provided between the optical connector within the cable connector assembly and the transceiver.

Front housing 1300 includes a spring mount region 1302, a housing extension 1304, an attachment protrusion 1306, back attachment portion 1308, and sub-connector slots 1310. Spring mount region 1302 is shown as an arcuate surface, here illustrated as a cylinder, that provides a region for which a spring 1400 may be mounted to the housing. Other types and shapes of mounting regions may be provided adapted for use with other types of biasing members used in place of spring 1400.

Housing extension 1304 provides an anti-snag feature as well as a trigger, here formed as a cantilever beam portion of the front housing 1300, for contacting and releasing latches 1212 and 1222 from an attached transceiver. The anti-snag aspect of the housing extension 1304 functions as a protective barrier so that latches 1212 or 1222 are shielded from snags, for example, due to movement of stray objects (e.g., other cables). Attachment protrusion 1306 and back attachment portion 1308 are provided for front housing 1300 to be attached to a rear housing 1600, to be shown later.

Sub-connector slots 1310 are provided for attachment of the optical fibers and sub-connectors to the front housing 1300. Sub-connector slots 1310 include an entry portion that allows for an optical fiber to be pressure-fitted into a larger region where the optical fiber may be suitably held in place. As a result, through the frictional fit, optical fibers and sub-connectors may be appropriately held within front housing 1300 without easily falling out. It can be appreciated that any suitable attachment mechanism may be used for appropriately attaching the front housing to the fiber optic cable and connector assembly.

In some embodiments, the fiber optic cable 1100 may have regions that vary in thickness depending on whether added protection and/or flexibility may be suitable. Within the optical fiber connector assembly, such as between front and rear housings, there may be regions of the fiber optic cable 1100 that may be more flexible to facilitate compliant motion of the optical connector that terminates the fiber. Conversely, a region of fiber optic cable 1100 coming off the back end of the optical connector may be thicker than another region of the fiber optic cable 1100 that is attached to the optical connector (not shown in the drawings). For example, cable that comes out of the rear end of the optical cable connector assembly may include a thicker jacket for extra protection. In some embodiments, multiple fibers are terminated within the connector where multiple strands may be included within the larger cable. In some embodiments, where a cable jacket is provided for the fiber optic cable up to the back of the rear housing, the cable jacket may be smaller or omitted from the rear housing to the optical connector, for added flexibility. For example, 0.9 mm or 2 mm cable may be used up to the front housing 1300, making it easier for the cable to bend and move without being overly stressed. Fiber optic cable 1100 may also exhibit flexibility while inside the front or rear housings, so that during any given movement, the cable can slip out of the way and take up any front housing movement.

Figures 3A, 3B:
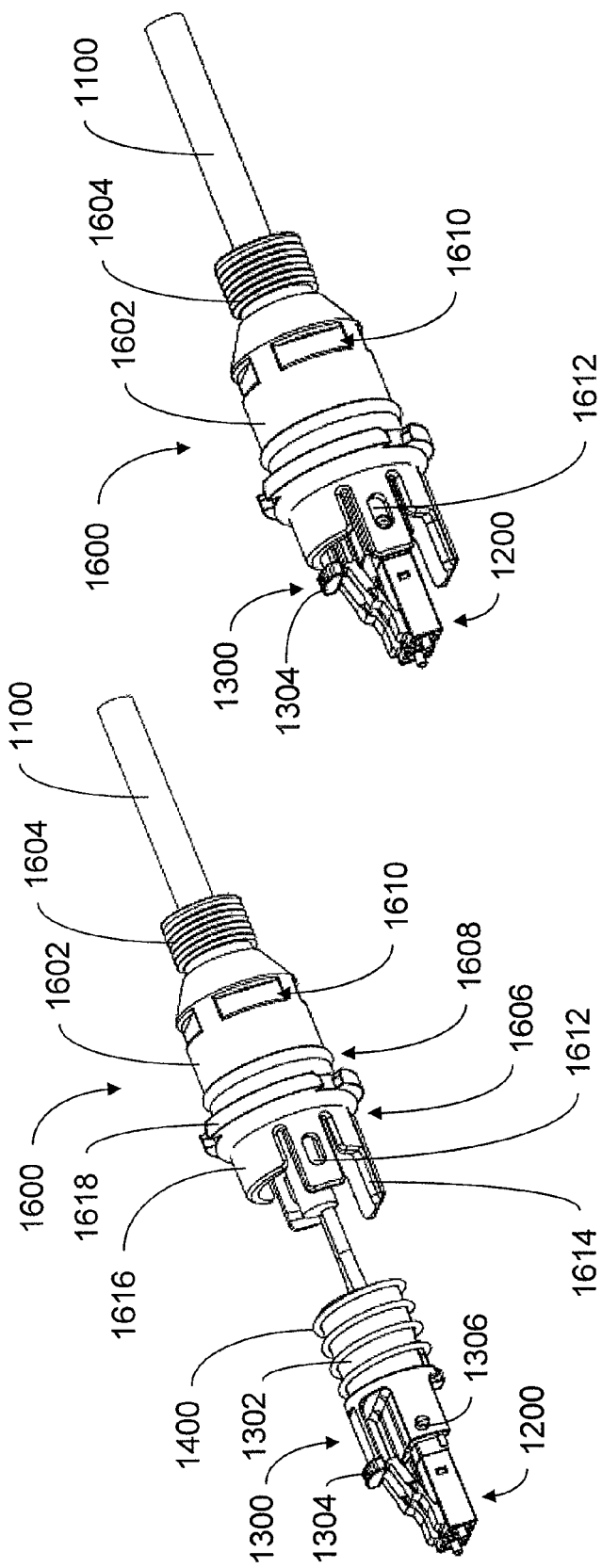
FIG. 3A is a perspective view of a front housing subassembly prior to assembly with a rear housing subassembly and a spring in accordance with the present invention.
FIG. 3B is a perspective view of the embodiment of FIG. 3A with the rear housing and the front housing assembled.

FIGS. 3A and 3B depict the optical fiber connector assembly 1000 with the two optical sub-connectors attached to the front housing 1300. The front housing 1300 is shown aligned for insertion into rear housing 1600. The assembly 1000 also includes a cable 1100, and includes front housing 1300 assembled to a spring 1400 and a rear housing 1600. FIG. 3A shows the spring 1400 mounted on the front housing 1300 prior to attachment of the rear housing 1600 to the front housing 1300.

As shown in FIG. 3A, a spring 1400 is mounted on the spring mount region 1302 of the front housing 1400. Rear housing 1600 includes a rear housing body 1602, a threaded region 1604, a first seal region 1606, a second seal region 1608, a boot attachment region 1610, a front housing attachment slot 1612, an upper region 1616, and a flange 1618. A lower attachment region 1614 may be included to fit within a corresponding opening within an adapter 2012, to be described below, to ensure that the cable connector assembly is appropriately aligned with the adapter.

FIG. 3B depicts the rear housing 1600 having been assembled to the front housing 1300. In attaching rear housing 1600 to front housing 1300, front housing attachment slot 1612 engages with attachment protrusion 1306. Attachment slot 1612 is depicted to allow for movement of the protrusion 1306, for example, in allowing for spring 1400 to be compressed and de-compressed back and forth. Protrusion 1306 may slide horizontally within attachment slot 1612. In some cases, protrusion 1306 may also slide vertically to provide at least two degrees of freedom associated with compliant motion of front housing 1300 relative to rear housing 1600. In this way, portions of the assembly, such as front housing 1300 may be suitably adjusted for changing positions and tolerance. It should be understood that any appropriate movement of the protrusion relative to the slot may be provided by such an arrangement.

Upper region 1616 of rear housing 1600 may provide further structure around housing extension 1304 of front housing 1300. In some embodiments, upper region 1616 may be more rigid than housing extension 1304 so that housing extension 1304 may be bendable to engage with latches of duplex optical connector 1200 for connector release, while upper region 1616 provides added protection for members of front housing 1300.

In FIG. 3B, although spring 1400 is not shown, it can be appreciated that rear housing 1600 covers the spring 1400. As relative movement is permitted between front and rear housings 1300 and 1600, spring 1400 may provide bias for rear housing 1600 away from front housing 1300 by a predetermined distance given by the front and rear housing attachments. Spring 1400 provides a forward force on front housing 1300 when rear housing 1600 is attached to an adapter or other mating structure. The attachment of rear housing 1600 to a mating structure may be through a locking nut (not shown in FIG. 3B) or other suitable attachment mechanism.

Figures 4A, 4B:
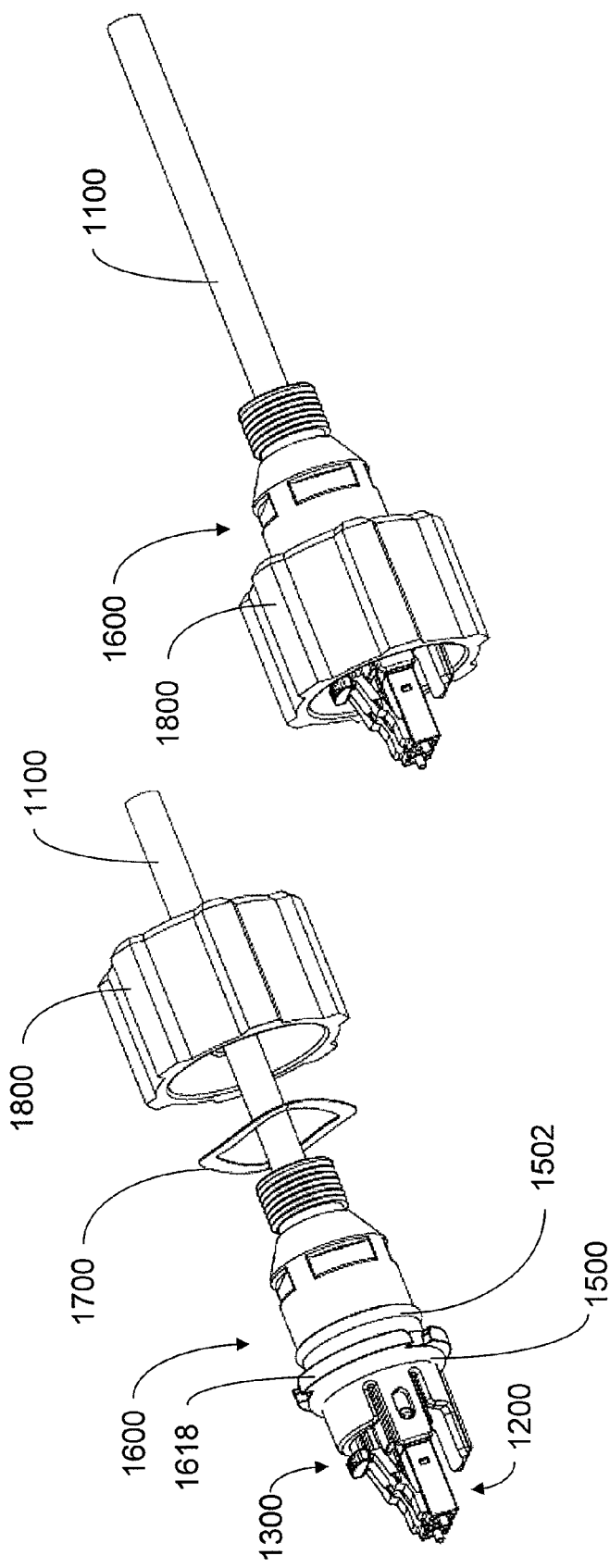
FIG. 4A is a perspective view of an embodiment of a fiber optic cable, connector, front housing, and rear housing prior to assembly with a coupling nut and wave washer in accordance with the present invention.
FIG. 4B is a perspective view of the embodiment of FIG. 4A with the coupling nut pushed up against the rear housing.

FIG. 4A depicts an illustrative embodiment of a cable 1100, a duplex optical connector 1200, a front housing 1300, a spring 1400 (not shown in FIG. 4A), and a rear housing 1600 during assembly with o-rings 1500 and 1502, a wave washer 1700, and a nut 1800. First o-ring 1500 is disposed at first seal region 1606 and second o-ring 1502 is disposed at second seal region 1608. In some embodiments, seal regions 1606 and 1608 of rear housing 1600 may be grooved or may include one or more suitable barriers that help to facilitate positioning of the o-rings in appropriate locations. In some embodiments, coupling nut 1800 is also pushed up against wave washer 1700, disposed in between flange 1618 and coupling nut 1800. Wave washer 1700 may provide a biasing force that aids in engaging a mechanism between locking coupling nut 1800 and flange 1618.

FIG. 4B shows coupling nut 1800 having been pushed up against rear housing flange 1618 (shown in FIG. 4A) of rear housing 1600. In some embodiments, coupling nut 1800 has freedom to move along the housing as it is not fixed to the housing. Though, in some embodiments, a mechanism may be included to hold coupling nut 1800 relative to the housing. Regardless of the nature of the attachment, coupling nut 1800 will engage some portion of the housing to pull the housing towards an adapter as the coupling nut 1800 is attached to the adapter. Here housing includes flange 1618 that engages coupling nut 1800 and blocks movement of the coupling nut 1800 further toward the duplex optical connector 1200. If sufficient pressure is exerted from the coupling nut 1800 toward the duplex optical connector 1200, as the combination of the rear housing 1400 and coupling nut 1800 moves toward the duplex optical connector 1200, the spring 1400 will compress. In some embodiments, once the attachment protrusion 1306 reaches the end of the attachment slot 1612, no further movement of the rear housing 1400 and coupling nut 1800 is permitted. O-rings 1500 and 1502 (shown in FIG. 4A) may provide for a seal from the environment as the nut 1800 engages with the flange 1618.

Figure 5B:
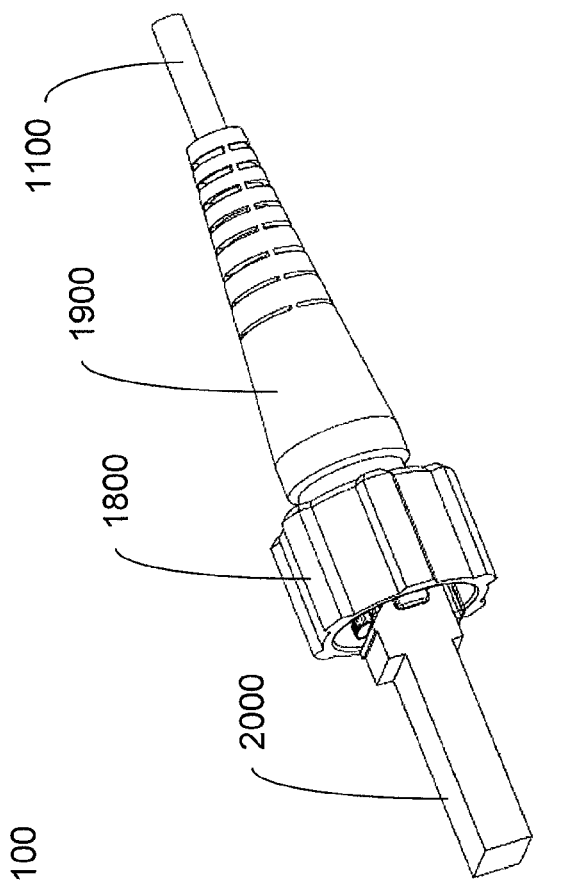
FIG. 5B is a perspective view of the embodiment of FIG. 5A with a transceiver attached to the connector.
Figure 5A:
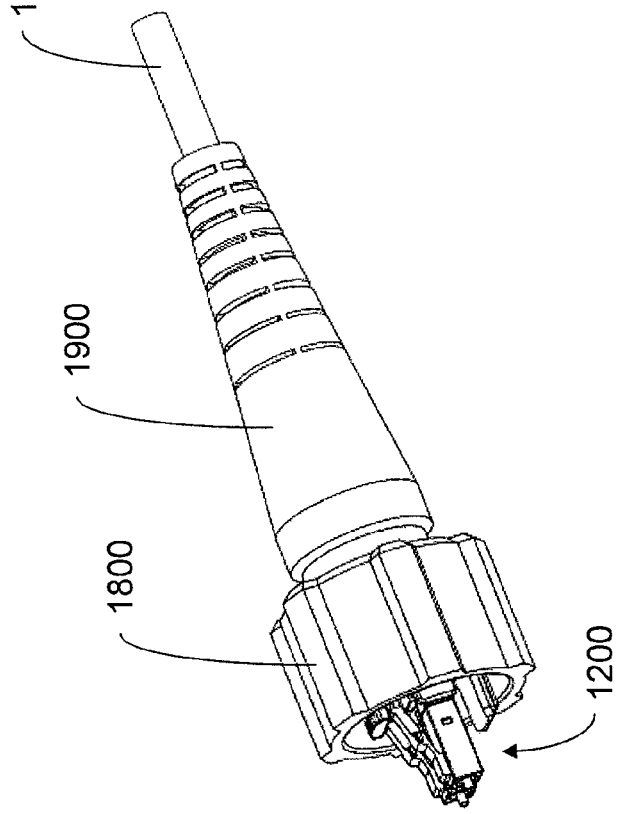
FIG. 5A is a perspective view of an embodiment of a boot attached to an assembly including a fiber optic cable, connector, front housing, rear housing, and a coupling nut in accordance with the present invention.

FIG. 5A depicts boot 1900 having been attached to rear housing 1600 (shown in FIGS. 4A and 4B). Boot 1900 may include inner portions that have the ability to engage with boot attachment region 1610 and/or threaded region 1604 of rear housing 1600. In some embodiments, inner portions of boot 1900 may include structure that appropriately engages with boot attachment region 1610, for example, through a pressure or snap fit attachment. Inner portions of boot 1900 may also include a threaded region that complements threaded region 1604. Boot 1900 provides added protection and/or strain relief for fiber optic cable 1100 in addition to a convenient gripping surface for a user to hold the optical fiber connector assembly 1000.

FIG. 5B shows optical fiber connector assembly having been mated with a transceiver 2000. As discussed above, the transceiver 2000 is used for translating optical signals to electronic signals and vice versa. As shown, the transceiver 2000 may be attached to duplex optical connector 1200. Transceiver 2000 may include appropriate mating regions that interface with duplex optical connector 1200 to establish a connection. In some embodiments, a mating region of transceiver 2000 is pushed up against the duplex optical connector 1200 to create a suitable attachment. Once an attachment is established, the transceiver 2000 may effectively be used as a part of the optical fiber connector assembly 1000.

It can be appreciated that the transceiver 2000 may be attached to the duplex optical connector 1200 prior to the optical fiber connector assembly 1000 being attached to an adapter of an electronic assembly. In some embodiments, the transceiver 2000 may be located in an adapter and cage of an electronic assembly before the optical fiber connector assembly is inserted. Features on the optical connector and the opening of the transceiver may be shaped to receive the optical connector and guide the optical fiber connector assembly into engagement with the transceiver. Within the optical fiber connector assembly, compliant motion of the spring allows the various connection methods to occur.

It should be understood that FIG. 5B illustrates the optical fiber connector assembly 1000 once it is removed from the electronic assembly through disengagement of the coupling nut 1800. Transceiver 2000 may be removed along with the optical fiber connector assembly 1000 and as a result, the transceiver 2000 is easily replaced.

When desired, the transceiver 2000 may also be disconnected from the duplex optical connector 1200. In some embodiments, the duplex optical connector 1200 includes latch connections, such as first and second sub-connector latches 1212 and 1222 that allow for simple disconnection of the transceiver 2000 from the duplex optical connector 1200. For example, to disconnect the transceiver 2000 from the duplex optical connector 1200, an object such as a tool may be inserted into an inner region of the coupling nut 1800 for pressing down of an appropriate latch in releasing the transceiver 2000 from the duplex optical connector 1200. Though, in embodiments in which coupling nut 1800 can slide along rear housing 1600, coupling nut 1800 may be retracted to provide access to the latch release mechanism, without the need for any special tools.

FIGS. 6A and 6B show an illustrative embodiment of an optical fiber connector assembly and transceiver being connected to an electronic assembly 2010. The electronic assembly 2010 includes an adapter 2012. Adapter 2012 provides a mechanism for a cable connector assembly to be attached to electronic assembly 2010. Though any suitable form of adapter, including those as are known in the art, may be employed, in the embodiment illustrated, adapter 2012 is mounted to an exterior wall (not expressly pictured), sometimes called a "panel," of electronic assembly 2010. Adapter 2012 has an opening that aligns with an opening in the panel such that when a cable connector assembly is attached to adapter 2012, connections may be made to components within electronic assembly 2010.

Figure 6C:
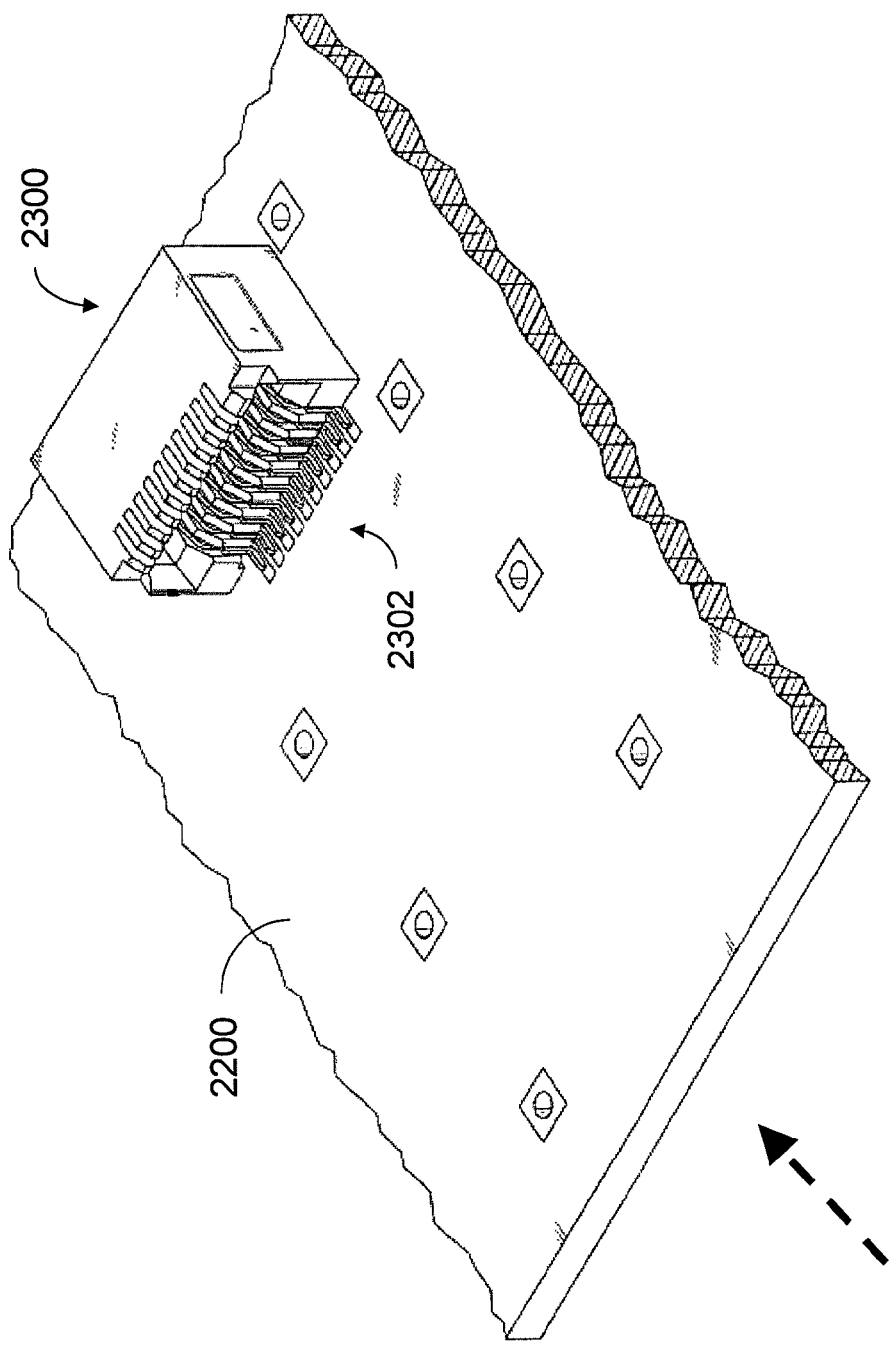
FIG. 6C is a perspective view of an electrical connector attached to a printed circuit board and for mating to electrical components coupled to a cable connector assembly.

Adapter 2012 has a connector slot 2014, a flange 2016, a first adapter o-ring 2018, a second adapter o-ring 2020, and a cage attachment portion 2022. In addition, a cage 2100 is shown attached to the electronic assembly 2010 and a printed circuit board 2200 is shown attached to the cage 2100. An electrical connector, an example of which is illustrated in FIG. 6C, may be attached to printed circuit board 2200 within cage 2100. The transceiver may make electrical connections to such a connector within cage 2100.

As shown, transceiver 2000 is attached to the duplex optical connector 1200 of the optical fiber connector assembly 1000. The transceiver 2000 is able to move relatively loosely into and out of portions of the cage 2100 and the electronic assembly 2010. In mating the optical fiber connector assembly 1000 along with transceiver 2000, with the electronic assembly 2010, the transceiver 2000 is moved toward the electronic assembly 2010 such that when the transceiver 2000 is appropriately disposed within the cage 2100, an electrical connection is created between the cage 2100 and an electrical connector 2300 (FIG. 6C). Electrical connections may be established between the transceiver and the printed circuit board 2200 through the electrical connector. Once the transceiver 2000 is taken out of the cage 2100, the electrical connection between the printed circuit board 2200 (through the electrical connector inside cage 2100) and the transceiver 2000 is severed.

As discussed above, a transceiver is able to appropriately convert optical signals into electrical signals and vice versa. Cage 2100 may position a transceiver, to communicate electrical signals to a printed circuit board 2200. FIG. 6C depicts a typical arrangement of an electrical connector 2300 that is attached to a printed circuit board 2200. Cage 2100 may fit over connector 2300 (cage 2100 is not illustrated in FIG. 6C), though vias by which it may be mounted circuit board 2100 are shown. The electrical 2300 includes contacts 2302 for interfacing with the transceiver. As a result, electrical signals may travel between the transceiver and the printed circuit board 2200 through the electrical connector 2300. It can be appreciated that any suitable electrical connector 2300 with appropriate contacts may be utilized. Electrical signals traveling from the printed circuit board 2200 through connector 2300 to a transceiver may be converted to optical signals for further communication through optical fiber connector assembly 1000. Other electrical components (not shown) may be attached to printed circuit board 2200 to generate or process those electrical signals.

As discussed previously, the transceiver may move relatively loosely into and out of the cage 2100. In such cases, when the transceiver is appropriately disposed within the cage 2100, an electrical connection is created with electrical connector 2300 as a force is applied on the transceiver, urging the transceiver toward connector 2300.

The dashed arrow in FIG. 6C depicts the direction the transceiver and optical fiber connector assembly must travel in the cage 2100 to establish a connection with the electrical connector 2300. Because the electrical connector 2300 is situated near the end of the cage 2100, upon connection of the coupling nut 1800 to the adapter 2012, as will be described later, biasing force provided by the spring 1400 generates a force that urges transceiver into the electrical connector 2300.

In connecting the optical fiber connector assembly 1000 with the transceiver 2000 to the electronic assembly 2010, the electronic assembly 2010 may be stationary while the optical fiber connector assembly 1000 is brought into contact toward the adapter 2012. In some embodiments, once a suitable connection is established between the transceiver 2000 and the cage 2100 through an electrical connector, the coupling nut 1800 may be engaged with a receiving portion of the electronic assembly 2010. However, in some embodiments, if the transceiver 2000 is already disposed in the adapter 2012, the tightening of the coupling nut 1800 with the connector slot 2014 of the adapter 2012 may give rise to engagement.

As discussed, a receiving portion of the adapter 2012 may include a connector slot 2014. Also discussed, engagement of the coupling nut 1800 and the connector slot 2014 includes rotating the coupling nut 1800 such that an inner member (not shown) of the coupling nut slides through the slot 2014. The coupling nut 1800 may be attached by clockwise rotation, and as the coupling nut is rotated relative to the electronic assembly 2010, the coupling nut 1800 may move in a direction toward the flange 2016 as the inner member of the coupling nut moves along the slot 2014. In some embodiments, as described previously, the inner member of the coupling nut 1800 may engage with a locking mechanism associated with the slot 2014 of the electronic assembly 2010, such as a latch, notch bend, interference/snap fit, or other suitable method. Similarly, wave washer 1700 may contribute to locking the coupling nut 1800 in place in relation to the adapter 2012 by pulling a projection from coupling nut 1800 into slot 2014 when coupling nut has been sufficiently rotated. Rotation required to release coupling nut 1800 may be precluded, unless coupling nut 1800 is pressed towards adapter 2012, thereby reducing the likelihood of accidental release of coupling nut 1800.

Upon mating of the optical fiber connector assembly 1000 and the electronic assembly 2010, the spring 1400 is placed in a compressed state, exerting a force such that the optical fiber connector assembly 1000 is biased away from the electronic assembly 2010. When the optical fiber connector assembly 1000 is disconnected from the electronic assembly 2010, force exerted from the compressed spring pushes the optical fiber connector assembly 1000 away from the electronic assembly 2010. Environmental seals may be created, for example through sealing members such as o-rings, so that portions of the electronic assembly, the transceiver, and the optical fiber connector assembly, when mated, can be safe from environmental conditions. In some embodiments, first adapter o-ring 2018 contributes in providing an environmental seal between flange 2016 and an assembly wall (not shown). Similarly, second adapter o-ring 2020 may contribute in providing an environmental seal between adapter 2012 and coupling nut 1800. Upon mating of the optical fiber connector assembly 1000 and the electronic assembly 2010, coupling nut 1800 is screwed in place along connector slot 2014 and second adapter o-ring 2020 ensures that a seal is provided between the external environment and an inner portion of the coupling nut 1800.

As discussed above, a transceiver 2000 is able to appropriately translate optical signals into electrical signals and vice versa. Cage 2100 may provide the ability for a transceiver 2000, upon electrical connection to the cage 2100 through an electrical connector, to communicate electrical signals to a printed circuit board 2200. Similarly, electrical signals from a printed circuit board 2200 may travel through cage 2100 through an electrical connector to a transceiver 2000, which may then translate the electrical signals to optical signals for further communication through optical fiber connector assembly 1000.

Figure 7B:
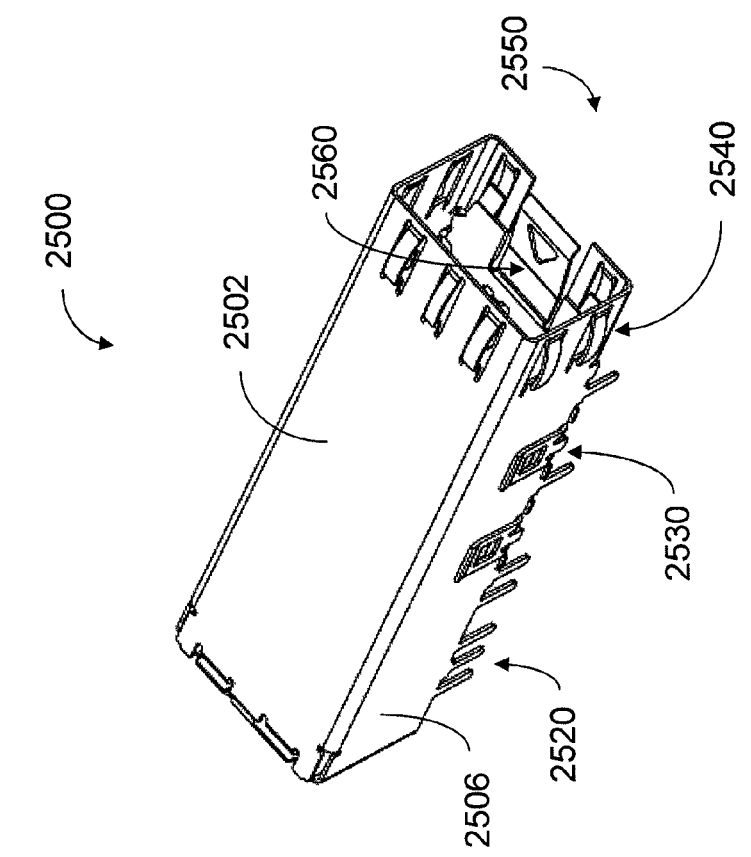
FIG. 7B illustrates a top perspective view of the embodiment of FIG. 7A.
Figure 7A:
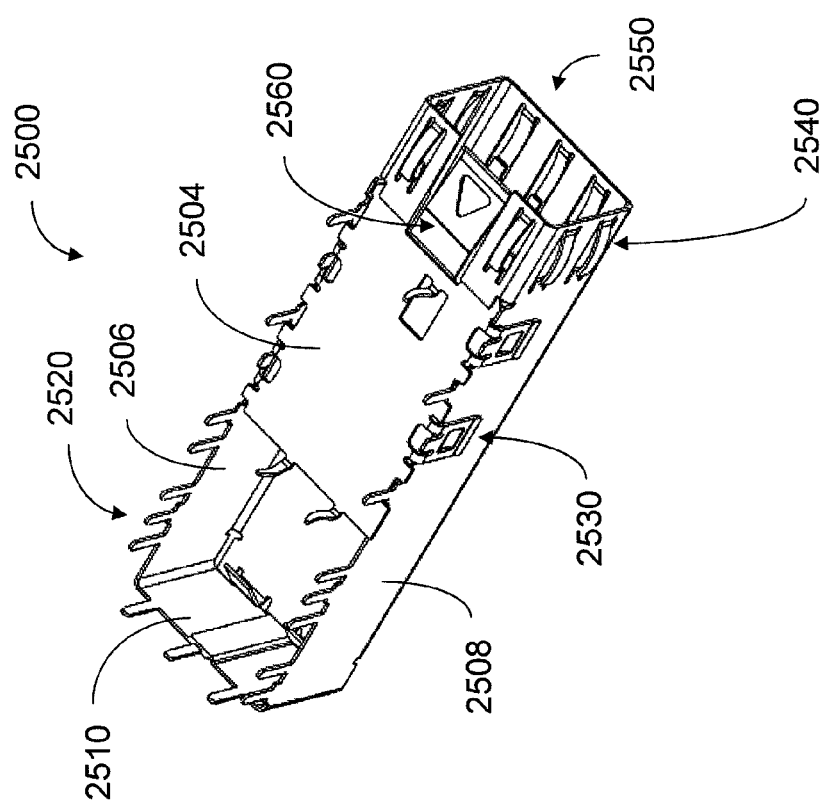
FIG. 7A is a perspective bottom view of a standard cage for holding a transceiver.

As described above, transceiver 2000 is not latched to cage 2100. FIGS. 7A and 7B depict an illustrative embodiment of a standard cage 2500 as is known in the art that includes features for engaging a transceiver. Standard cage 2500 includes top wall 2502, bottom wall 2504, side walls 2506 and 2508, back wall 2510, bottom attachment regions 2520, side regions 2530, panel attachment regions 2540, transceiver opening 2550, and lock portion 2560. Panel attachment region 2540 is included so that an end of the standard cage 2500 may be appropriately attached to an opening of a panel so as to provide an electrical seal. In some embodiments, panel attachment region 2540 may include protrusions that form a frictional fit with a cage attachment portion 2022. In some embodiments, panel attachment region 2540 may include attachment spring fingers for engagement with a panel opening in an electronic assembly.

In a standard cage 2500, a lock portion 2560 is provided so that a transceiver is attached to the standard cage pushing the transceiver into the cage body such that a notch on the lock portion 2560 engages a tab on the transceiver for locking the transceiver into the standard cage. Upon disconnection of the transceiver from the standard cage, the notch and tab engagement is released on the lock portion 2560, and the transceiver and standard cage are released.

Figures 7C, 7D:
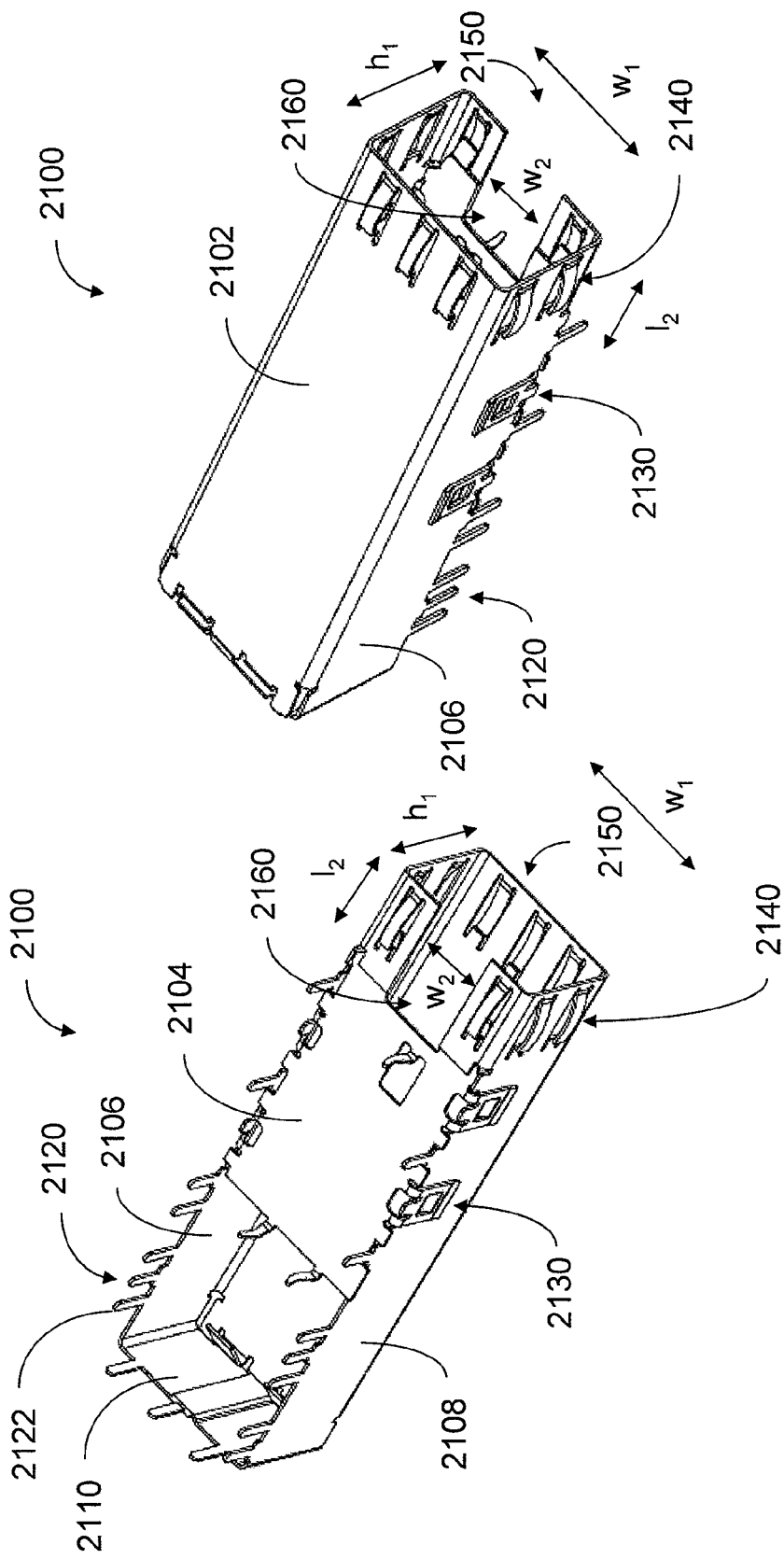
FIG. 7C is a perspective bottom view of an embodiment of a modified cage for holding a transceiver in accordance with the present invention.
FIG. 7D illustrates a top perspective view of the embodiment of FIG. 7C.

FIGS. 7C and 7D depict an illustrative embodiment of a modified cage 2100, as used herein, providing for relatively loose movement of the transceiver into and out of the cage without a latch connection. Cage 2100 includes top wall 2102, bottom wall 2104, side walls 2106 and 2108, back wall 2110, bottom attachment regions 2120, attachment posts 2122, side regions 2130, panel attachment regions 2140, transceiver opening 2150, and cut out 2160. In some embodiments, bottom attachment regions 2120 include attachment posts 2122 that may be suitably attached to an appropriate printed circuit board 2200. Side regions 2130 provide the ability for the cage 2100 to have a slight pressure fit with a transceiver or other attachment member. In some cases, no pressure fit or attachment may exist between cage 2100 and a transceiver, as the transceiver to be easily removed. Panel attachment region 2140 is included so that an end of the cage 2100 may be appropriately attached to an opening of a panel so as to provide an electrical seal. In some embodiments, panel attachment region 2140 may include protrusions that form a frictional fit with a cage attachment portion 2022. In some embodiments, panel attachment region 2140 may include attachment slots for engagement with complementary portions of a cage attachment portion 2022.

A transceiver 2000 may be inserted into cage 2100 through a transceiver opening 2150. Transceiver opening 2150 may have any suitable dimensions. In some cases, transceiver opening dimensions may be according to SFP or QSFP configurations. In some embodiments, a transceiver opening 2150 may have a width $w_1$ ranging between about 10 mm and about 15 mm or between about 15 mm and about 20 mm. In some embodiments, a transceiver opening 2150 may have a height $h_1$ ranging between about 6 mm and about 11 mm or between about 7 mm and about 12 mm.

The cage 2100 may also include a cut out 2160 adjacent to the bottom wall 2104. Cut out 2160 is positioned to align with a protrusion of a standard transceiver designed to engage lock portion 2560 of a standard cage (FIGS. 7A and 7B). As a result, a transceiver, even a standard transceiver with a locking protrusion, does not engage with a modified cage 2100. Rather, mating force between a transceiver and an electrical connection member is provided by spring force generated with the optical cable connector assembly. As a result, when the optical fiber connector assembly is disconnected, the retention force is likewise removed and the transceiver can easily be removed from cage 2100.

In a standard SFP interconnection, an actuation mechanism may be provided on the cage to release the transceiver from the locking feature of the cage. Frequently, the actuation mechanism is shaped and positioned such that the actuation mechanism can be operated by a user pressing on the mechanism with a finger. However, when the cage is mounted adjacent a panel adapter configured to provide an environmental seal, access to the actuation mechanism becomes difficult. In the embodiment illustrated, the transceiver can be more easily removed than in a standard SFP interconnection with an actuation mechanism to release a tab, notched locking members or other protrusion.

Cut out 2160 may have any suitable dimensions. In some embodiments, cut out 2160 may have a width $w_2$ of at least 3 mm; or ranging between about 3 mm and about 6 mm. In some embodiments, cut out 2160 may have a length $l_2$ of at least 5 mm; or ranging between about 5 mm and about 8 mm. In some embodiments, upon connection of a transceiver 2000 and a cage 2100, portions of a transceiver 2000, such as a bottom tab or other protrusion may be disposed within the cut out 2160. It should be understood that cut out 2160 could include embodiments where the floor of the cage is substantially omitted, either in entirety or partially.

Techniques as described above for generating a biasing force within a cable connector assembly to make an electrical connection between conductive members coupled to a cable connector assembly and a connector within an electronic assembly may be applied to other types of connectors, including electrical connectors. By ensuring an appropriate connection without the use of a latching mechanism, the cable connector assembly can be easily connected and disconnected from an adapter, even in the cable connector assembly and adapter are environmentally sealed, which could otherwise make access to a latch release mechanism difficult.

Figure 8A:
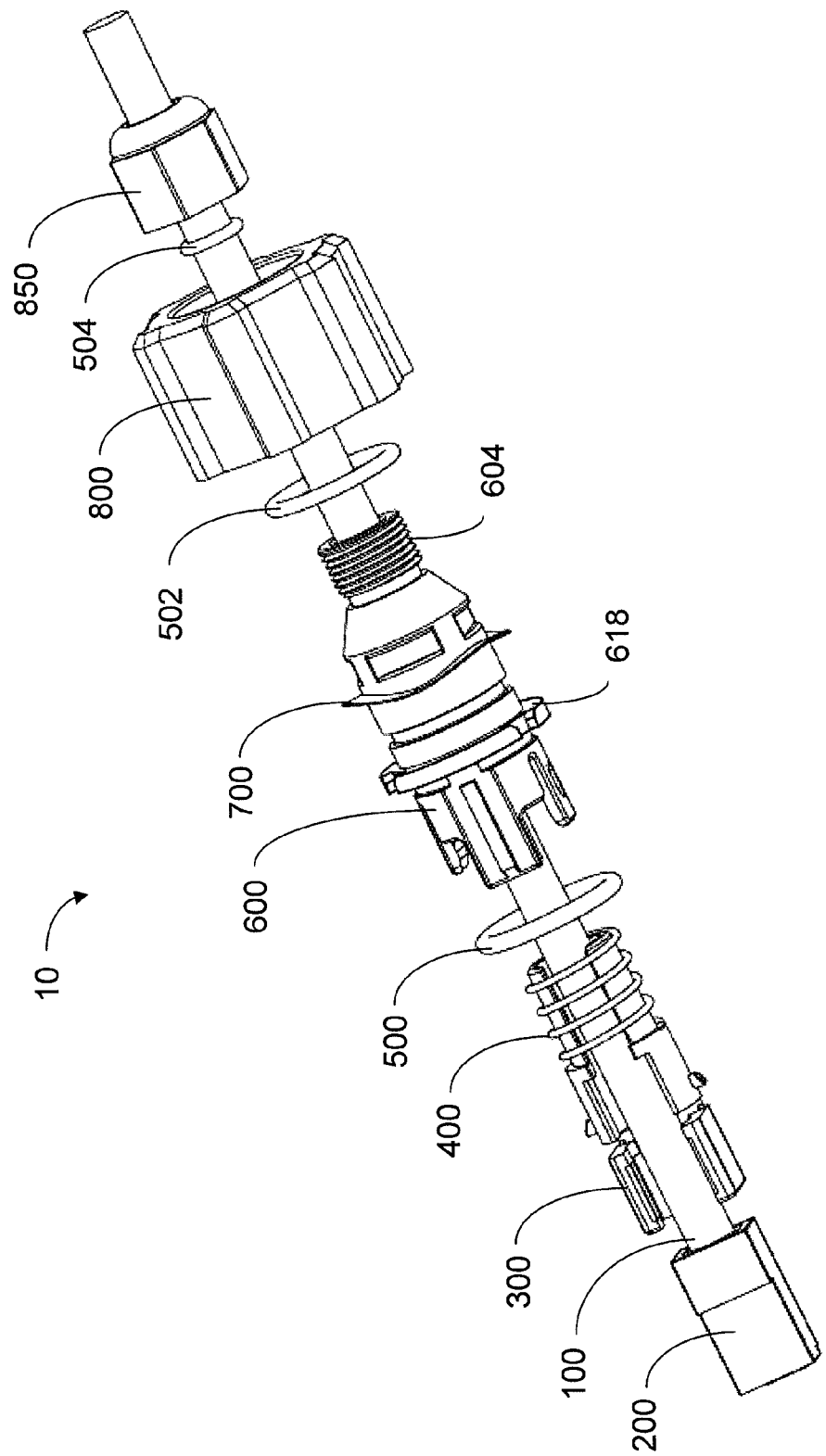
FIG. 8A is an exploded perspective view of one exemplary embodiment of a pre-assembled outdoor electrical connector assembly in accordance with the present invention.
Figure 8B:
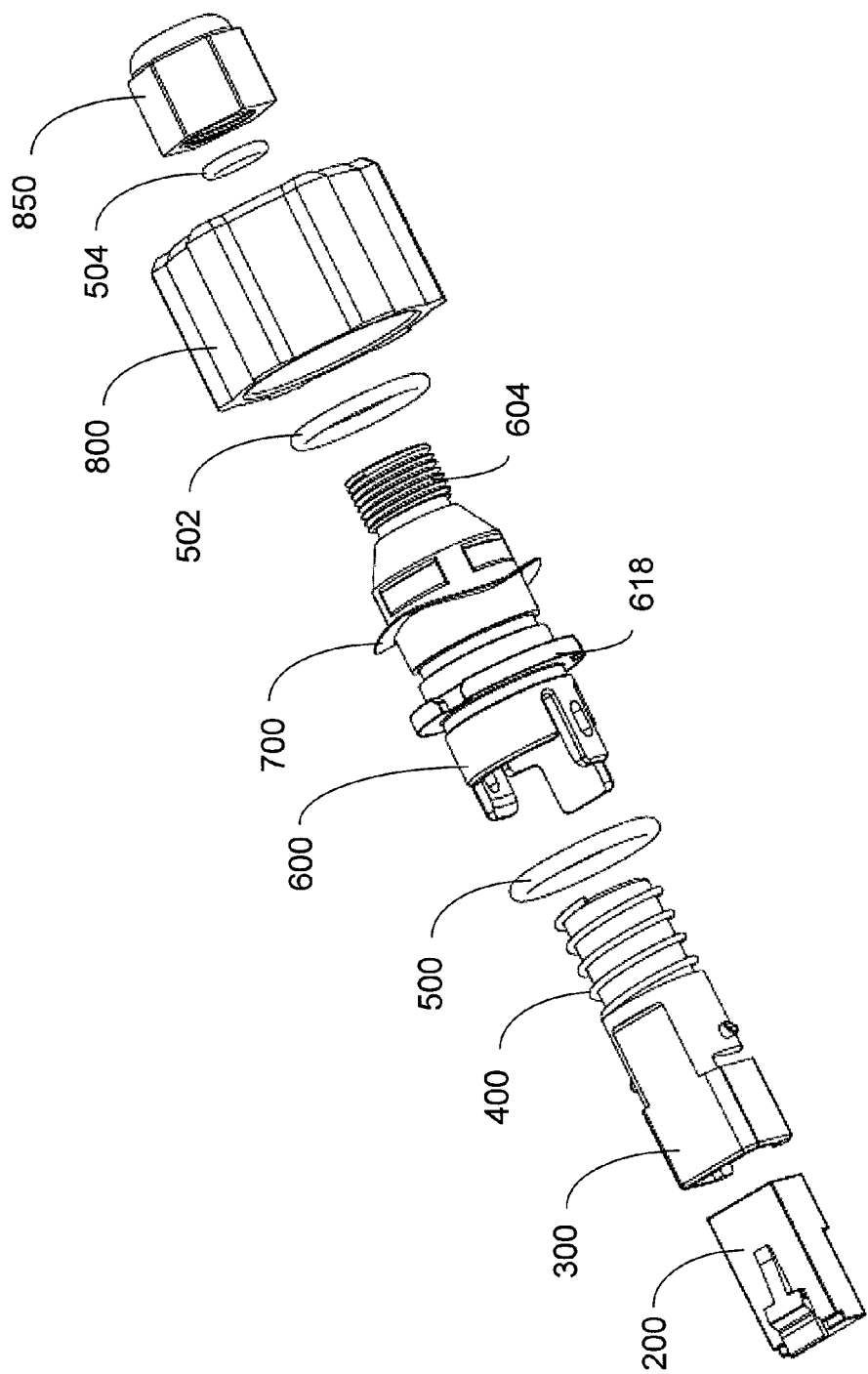
FIG. 8B is an exploded perspective view of the embodiment of FIG. 8A, shown from an opposite view from FIG. 8A and without the electrical cable.

FIGS. 8A and 8B show an illustrative embodiment of an electrical connector assembly 10 prior to or during assembly and before connection to an adapter. FIG. 8A depicts the assembly including an electrical cable 100 and FIG. 8B shows the assembly without the electrical cable 100.

The electrical cable connector assembly 10 is attached to an electrical cable 100. The assembly includes an electrical connector 200 attached to a cable. In the embodiment illustrated, electrical connector 200 is a plug-type connector, such as an RJ-45 connector. However, one or more of the electrical connector, an adapter to which the cable connector assembly attaches, the connector within an electronic assembly to which connector 200 mates or the cable connector assembly may be structured to preclude latching between the plug and jack as in a standard RJ-45 connector. Rather, using a biasing member within the cable connector assembly 10, a force adequate to provide mating between the plug and jack may be provided.

As shown, electrical cable connector assembly includes a front housing 300, a spring 400 mounted on the front housing, a first o-ring 500, a rear housing 600, and wave washer 700, a second o-ring 502, a coupling nut 800, a third o-ring 504, and an end nut 850. As described above, the spring acts as a biasing member and the o-rings act as sealing members. The coupling nut and wave washer cooperate in making an attachment to an adapter. However, it should be appreciated that these components are examples of suitable components and that variations are possible.

Electrical connector 200 may be included in any suitable electrical cable connector assembly useful for transferring electrical signals to a jack within an electronic assembly. As illustrated, the electrical connector 200 is an RJ45 connector, however, it can be appreciated that any suitable connector may be employed.

The electrical cable 100 may carry electrical signals to and/or from a component to which electrical connector 200 is mated. In exemplary embodiments described herein, electrical connector 200 mates with an electrical jack. However, the component to which electrical connector 200 mates is not a limitation on the invention.

A cable connector assembly may be assembled from the components illustrated in FIGS. 8A and 8B using known techniques or in any other suitable way. For example, the components may be assembled by threading the cable through the spring 400, the first o-ring 500, the rear housing 600, the wave washer 700, the second o-ring 502, the coupling nut 800, the third o-ring 504, and the end nut 850. In various embodiments, these components are placed on the electrical cable 100 in the order listed above. Electrical connector 200 may then be attached to a cable 100 in any appropriate manner.

Once the other components are positioned over the electrical cable 100, front housing 300 may subsequently be placed over cable 100. Electrical connector 200 may then engage front housing 300. Any suitable engagement mechanism may be used. For example, electrical connector 200 may snap into front housing 300 or, for example, may be secured with an adhesive. O-rings 500 and 504 may then be slid over rear housing 600 and front housing 300 may be coupled to rear housing 600. End nut 850 may then be tightened around a threaded region 604 of rear housing 600. When secured to rear housing 600, end nut 850 may help to prevent coupling nut 800 from sliding off the back end of rear housing 600.

Flange 618 prevents coupling nut 800 from sliding off the forward end of rear housing 600 and is an example of a feature that can be engaged by coupling nut 800 as it is pulled towards an adapter. Such a feature allows force generated as coupling nut 800 attaches to an adapter to be transferred to rear housing 600 to push connector 200 forward. As illustrated, wave washer 700 is captured between coupling nut 800 and flange 618, which as described above in connection with wave washer 1700 may aid in attaching coupling nut 800 to an adapter.

In some embodiments, rear housing 600 is appropriately attached to the cable 100. For example, rear housing 600 may be crimped on to cable 100 through a suitable engagement. In some cases, such an engagement may be a frictional fit or an adhesive.

Components of electrical cable connector assembly 10 may be manufactured from any appropriate materials. For example, housing components 300 and 600 may be plastic. O-rings 500, 502, and 504 may be rubber or another suitable sealing material. Spring 400 may be stainless steel or another appropriate biasing.

FIGS. 9A and 9B depict attachment of front housing 300 to a portion of electrical cable 100 with electrical connector 200 attached. FIG. 9A shows the front housing 300 prior to attachment to the electrical connector 200 and electrical cable 100. FIG. 9B depicts the front housing 300 assembled with the electrical connector 200 and electrical cable 100.

It can be appreciated that any suitable electrical cable of appropriate construction may be used in the connector assembly. Electrical connector 200 includes connector body 202, a front housing attachment region 204, and a connector latch 206. The connector body 202 is shaped so as to appropriately engage with a jack within an electronic assembly. Front housing attachment region 204 includes a stepped portion adjacent to recessed region that allows for an appropriately shaped housing to be attached to the electrical connector 200.

In the embodiment illustrated, connector latch 206 is a latch as exists in a standard connector, but is not a requirement for the invention. In a standard connector, latch 206 provides a mechanism for an electrical connector 200 to be attached to a jack, holding the electrical connector and jack in position for reliable communication of electrical signals between connector 200 and the jack.

However, as described herein, a required mating force may be generated by a biasing member, such as spring 800. Also, latching between connector 200 and a jack within an electronic assembly may be avoided to facilitate easy removal of the cable connector assembly. Accordingly, in some embodiments, latch 206 is omitted or rendered inoperative. As shown in FIG. 9B, when connector 200 is inserted into front housing 300, latch 206 is retained under a lip of housing 300, holding latch 206 in an unlatched state. Accordingly, releasing cable connector assembly 10 from an adapter allows connector 200 to be easily removed.

The approach for avoiding latching illustrated in FIG. 9B allows an unmodified standard connector with a latching member to be used. Other approaches for avoiding latching may alternatively or additionally be used. For example, latch 206 could be removed or a connector without a latch could be used. As another example, a jack to which connector 200 mates may be formed with a cut out that aligns with latch 206 such that when connector 200 is inserted into the jack, latch 206 does not engage a feature of the jack to complete the latching operation.

Front housing 300 includes a front housing body 302, a latch recess 304, a connector attachment region 306, an attachment protrusion 308, a biasing mount region 310, and a back attachment portion 312. The latch recess 304 of the front housing 300 provides space for a portion of the connector latch 206 to be disposed within, which holding latch 206 is its released state. The connector attachment region 306 includes under hanging portions that provide for a snap fit between front housing 300 and electrical connector 200. Though, in other embodiments, portions of the connector attachment region 306 may exert pressure on the front housing attachment region 204 of the electrical connector 200 so as to form a suitable frictional fit between the two members. Front housing 300 may be designed to move slightly both horizontally and vertically with respect to the fiber cable 100. Such movement may allow for further tolerance or general stack up issues.

Attachment protrusion 308 and back attachment portion 312 are provided for front housing 300 to be attached to a rear housing 600 to be shown later. Spring mount region 310 is also depicted as a relatively arcuate surface (e.g., cylindrical) that provides a region for which a spring 400 may be mounted to the housing. Such an embodiment is suitable for mounting a coiled spring. It can be appreciated that any suitable attachment mechanism may be used for attaching a biasing member. Similarly, any suitable mechanism may be used for attaching the front housing to the cable and connector assembly, and the shape selected in any embodiment may depend on the shape of the spring or other biasing member used.

Figure 10B:
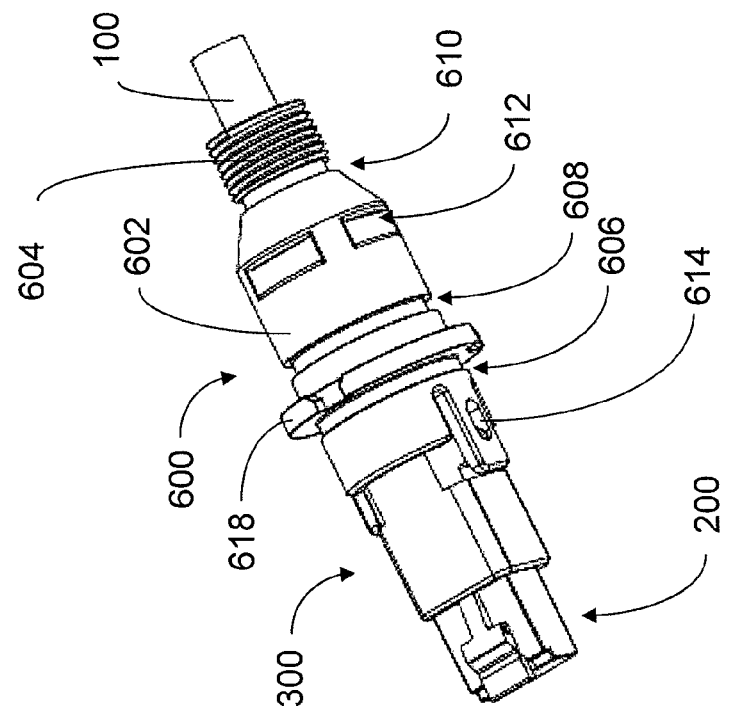
FIG. 10B is a perspective view of the embodiment of FIG. 10A with the rear housing and the front housing assembled.
Figure 10A:
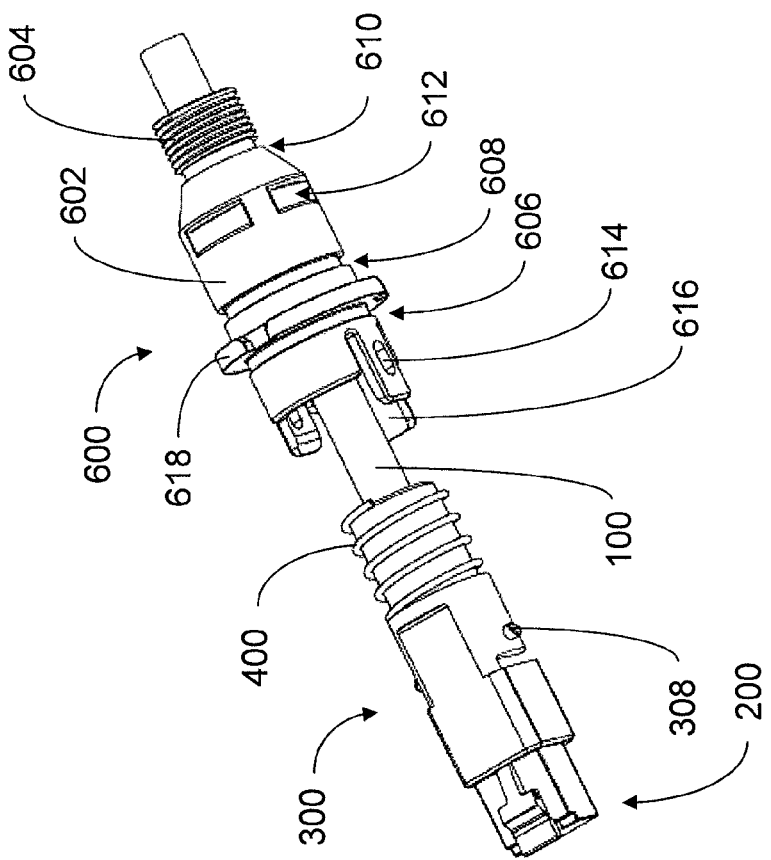
FIG. 10A is a perspective view of an embodiment of an electrical cable, connector, and front housing prior to assembly with a rear housing and a spring in accordance with the present invention.

FIGS. 10A and 10B depict the electrical cable 100, the electrical connector 200, and the front housing 300 being assembled to a spring 400 and a rear housing 600. FIG. 10A shows the spring 400 mounted on the front housing 300 prior to attachment of the rear housing 600 to the front housing 300. FIG. 10B depicts the rear housing 600 having been assembled to the front housing 300.

As shown in FIG. 10A, a spring 400 is mounted on the biasing mount region 310 of the front housing 400. Rear housing 600 includes a rear housing body 602, a threaded region 604, a first seal region 606, a second seal region 608, a third seal region 610, an attachment region 612, a front attachment slot 614, a front attachment portion 616, and a rear housing flange 618. In some embodiments, attachment region 612 or another portion of the electrical connector assembly 10 may be shaped to receive a boot for providing strain relief along the cable. A boot may be attached in any suitable way, for example, through a frictional fit or a slot attachment.

Electrical cable 100 may be attached to the electrical connector 200 and the rear housing 600 in a number of appropriate ways. In some embodiments, a crimp may be used to secure the cable to the rear housing 600 or the electrical connector 200 and an over mold or an adhesive heat shrink may be used to provide a seal and strain relief.

In attaching rear housing 600 to front housing 300, a compliant coupling may be used to allow relative motion of the components. In the embodiment illustrated, front housing 300 is slidably coupled to rear housing 600. That slidable coupling is achieved in the illustrated embodiment through front attachment slot 614, which engages with attachment protrusion 308, and corresponding engagement on the opposite side of the rear housing (not visible in FIGS. 10A and 10B).

Attachment slot 614 is depicted to allow for back and forth movement of the protrusion 308, for example, in permitting compression and de-compression of the spring 400. In some embodiments, in providing movement of protrusion 308, attachment slot 614 may have a length ranging between about 0 mm and about 2 mm. In addition, protrusion 308 may be sixed relative to slot 614 to also room for protrusion 308 to move transverse to the elongated dimension of slog 614. This type of mounting may provide for compliant motion with at least two degrees of freedom for front housing 300 relative to the rest of the cable connector assembly. Such compliance allows final position of the connector 200 to be controlled by the positioning of a jack within an electronic assembly to which cable connector assembly 10 may be attached.

In some embodiments, front attachment portion 616 includes a keying region that engages with a complementary portion of the adapter 902. A keying region precludes incorrect insertion of cable connector assembly 10 into an adapter, which could cause damage to the cable connector assembly. Other features of rear housing 600 shown in the illustrative embodiment include regions that provide for other elements of the connection assembly to be incorporated, such as a boot and/or end nut.

FIG. 10B, illustrates front housing coupled to rear housing. Although spring 400 is not shown, it can be appreciated that rear housing 600 covers the spring 400. As relative movement is permitted between front and rear housings 300 and 600, spring 400 may provide bias for front housing 300 pushed away from rear housing 600 by a predetermined force as dictated by the spring 400. In some embodiments, force generated by the spring may range between about 2 N and about 75 N.

Figure 11A:
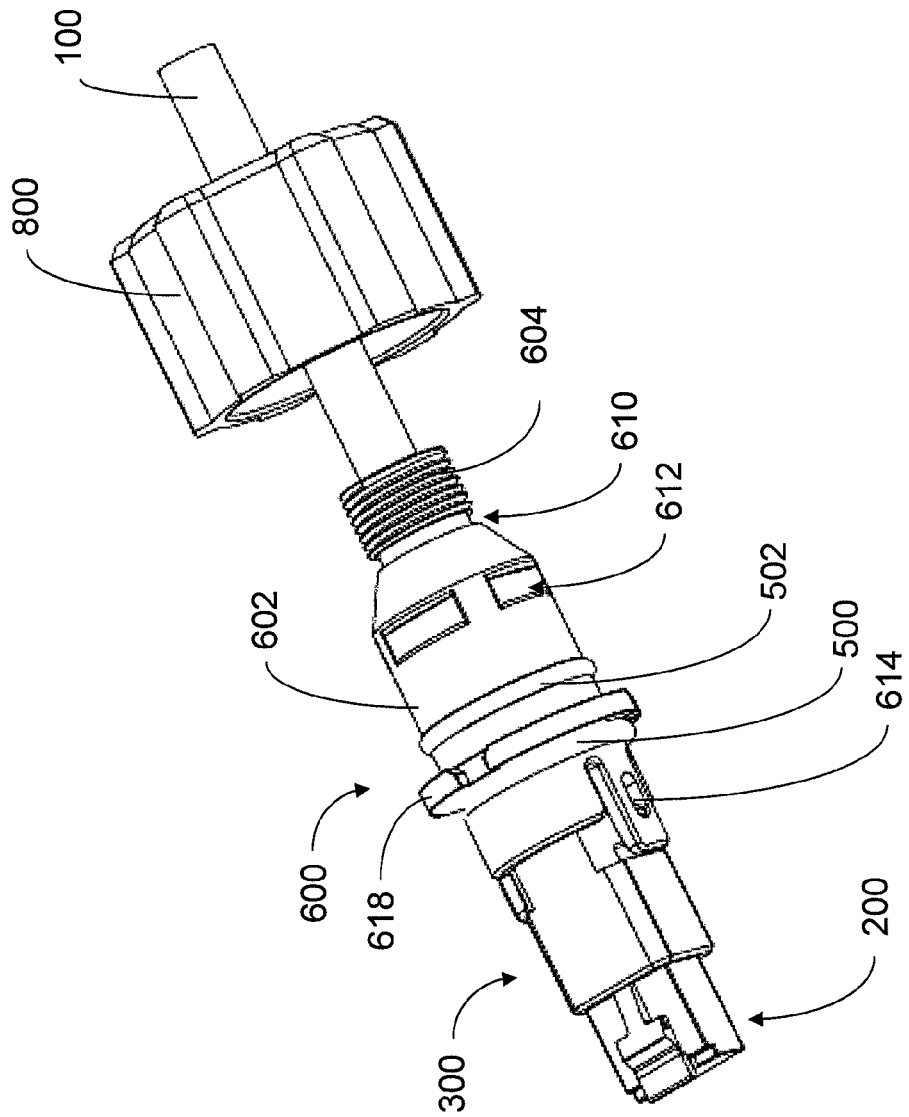
FIG. 11A is a perspective view of an embodiment of an electrical cable, connector, front housing, and rear housing prior to assembly with a coupling nut in accordance with the present invention.

FIG. 11A depicts cable 100, electrical connector 200, front housing 300, and rear housing 600 during assembly with o-rings 500 and 502, and a coupling nut 800. (Spring 400 is not visible in FIG. 11A.) First o-ring 500 is disposed at first seal region 606 and second o-ring 502 is disposed at second seal region 608. In some embodiments, seal regions 606 and 608 of rear housing 600 may be grooved (as shown in FIGS. 8A and 8B) or, for example, may include one or more suitable barriers that help to facilitate positioning of the o-rings in appropriate locations.

FIGS. 11B and 11C show an illustrative embodiment of a coupling nut 800 having been pushed up against rear housing flange 618 (not shown in FIGS. 11B and 11C) of rear housing 600. It can be appreciated that coupling nut 800 has freedom to move along the housing as it is not fixed to the housing. However, flange 618 and wave washer 700 will block movement of the coupling nut 800 past the flange 618 further toward the electrical connector 200. If sufficient force is exerted on the coupling nut 800 toward the electrical connector 200 as the combination of the rear housing 400 and coupling nut 800 moves toward the electrical connector 200, the spring 400 will compress. Once the spring 400 is fully compressed, no further movement of the rear housing 400 and coupling nut 800 is permitted. O-ring 502 (not shown in FIGS. 11B and 11C) provides for a seal from the environment as the coupling nut 800 engages with the flange 618. In some embodiments, coupling nut 800 is also pushed up against wave washer 700, disposed in between flange 618 and coupling nut 800.

In some embodiments, once mounted, an appropriate method for preventing the coupling nut 800 from sliding off the back of the connector assembly may be used. For example, an over mold may be provided for keeping the coupling nut 800 on the assembly. In some cases, another assembly member, such as a boot or a threaded nut, may be provided in helping to prevent coupling nut 800 from sliding excessively.

FIGS. 11B and 11C also depict a third o-ring or grommet 504 and an end nut 850 being incorporated with the connection assembly. During assembly, third o-ring 504 is placed on third seal region 610 and an inner portion of end nut 850 is threaded so as to be screwed on to threaded region 604. As a result, the third o-ring or grommet 504 provides a further appropriate environmental seal between the end nut 850 and rear housing 600.

In some embodiments, a boot is attached to the rear housing 600. In some embodiments, an end nut 850 is attached to a threaded portion of the rear housing 600. In other embodiments, both a boot and an end nut 850 may be attached to an end region of the rear housing 600. In some cases, a boot may be an over mold or an injection molded boot. An over mold boot may be a factory installed item, yet can be used in field installations. End nut 850 may be used in a gland or compression fitting, for example. End nut 850 may provide less strain relief than a boot, but may be more convenient for use in field installations. Various connector versions may be used as factory installed products or as a field installed products.

Rear housing 600 also includes attachment region 612 for incorporation of a boot into the connection assembly.

FIGS. 12A and 12B show an illustrative embodiment of an electrical connector assembly 10 being connected to an electronic assembly 900. Electronic assembly 900 may be any suitable type of electronic assembly that includes electronic circuitry for routing or otherwise processing electrical signals. Electronic assembly 900 could include complex circuitry or relatively simple circuitry, such as a network interface at an entry to a home. In such an embodiment, the electronic assembly may simply be a distribution point for electrical signals.

Regardless of the function performed by electronic assembly 900, it may have a panel (not shown) to which an adapter 902 is mounted. Adapter 902 may be mounted such that it forms an environmental seal around an opening in the panel. Through this opening, a connection may be made to electronic components within electronic assembly 900. By providing an environmental seal between an electrical cable connector assembly and adapter 902, a connection may be made to the electronic components within electronic assembly 900 while protecting those components from dirt, moisture and other environment conditions.

In the embodiment illustrated, first adapter o-ring 912 provides an environmental seal between adapter 902 and the panel (not shown for simplicity). A second adapter o-ring 914 aids in providing a seal between adapter 902 and a cable connector assembly, such as assembly 10 when electrical connector assembly 10 is secured to adapter 902.

One or more attachment features may be used to secure connector assembly 10 to adapter 902. In the embodiment illustrated, a slot 904 is formed on an outer surface of adapter 902. Coupling nut 800 may have a complimentary projecting member (not shown) extending from an inner surface. When the complimentary projecting member engages slot 904 and coupling nut 800 is rotated, slot 904 will act as a camming member that draws coupling nut 800 and adapter 902 together. Though, it can be appreciated that other attachment features are possible. For example, the outer surface of adapter 902 may have threads and the inner surface of coupling nut 800 may contain complimentary threads.

Within electronic assembly 900 are various elements, including a cage 908 and a printed circuit board 910. Printed circuit board 910 provides a mounting location for electronic components, such as an electrical connector to make electrical connections to a jack. Cage 908 surrounds the electrical connector and the jack. Printed circuit board 910 may be manufactured using known techniques and may include an electrical connector of known design, and may be a connector meeting appropriate standards. Though, any suitable electronic components may be attached to printed circuit board 910. Cage 908 may be formed from one or more sheets of metal or other conductive material using techniques as are known in the art, and may be a cage meeting appropriate standards. However, as described in greater detail below, cage 908 may contain novel portions to facilitate ease of removal of a jack.

In connecting the electrical connector assembly 10 to the jack and the electronic assembly 900, FIG. 12A depicts the electrical connector 200 not having yet been mated with a connector disposed within the electronic assembly 900. The electronic assembly 900 is held in place while the electrical cable connector assembly 10 is brought toward the adapter 902. In the embodiment illustrated, once a suitable connection is established between the electrical connector 200 and the jack within the electronic assembly 900, the coupling nut 800 may be engaged with a receiving portion of the electronic assembly 900. Engagement of the coupling nut 800 and the receiving portion of the electronic assembly 900 may include engagement with a connector slot 904 of adapter 902. As a result, rotating the coupling nut 800 may lead to an inner member (not shown) of the coupling nut 800 sliding along the slot 904. The coupling nut 800 may be rotated in by clockwise directed, and, through a camming force, the nut moves in a direction toward the flange 906 as the inner member of the nut moves along the slot 904. In some instances, an inner member of a nut may be an inner protrusion. Clockwise and counterclockwise rotation are determined with respect to the orientation shown by the arrow in FIG. 5A pointing in a direction from the electrical connector assembly 10 toward the electronic assembly 900, though it should be appreciated that the direction of rotation is not critical to the invention. In some embodiments, engagement of the coupling nut 800 and an adapter 902 may include a bayonet type connection or may include threads or other suitable forms.

In some embodiments, the inner member of the coupling nut 800 engages with a locking mechanism associated with the slot 904 of the adapter 902. For example, a locking mechanism could include frictional fit between a portion of the connector slot 904 and an inner member of the coupling nut 800. In some cases, a locking mechanism could include a separate latch system. In some embodiments, when a projection of the coupling nut 800 is positioned near the end of the slot 904, there is a widened region of the slot 904, acting as a keyed region. Upon reaching the widened region of the slot 904, wave washer 700 may bias the coupling nut 800 to pull back, which draws the projection back into the keyed region, preventing back rotation of coupling nut 800.

Regardless of the locking mechanism used, coupling nut 800 and flange 906 may be shaped such that coupling nut 800 is drawn towards flange 906 as those components engage. Upon mating of the electrical connector assembly 10 and the electronic assembly 900, as the coupling nut 800 moves toward the flange 906, the spring 400 (shown in FIGS. 8A, 8B, and 10A) is placed in a compressed state. As a result, when the electrical connector assembly 10 is fully mated with the electronic assembly 900, the compressed spring exerts force tending to separate the front housing 300 and the rear housing 600. Because the rear housing 600 is prevented from moving backwards once it presses against coupling nut 800, the spring force translates to an overall push out force on the front housing 300 containing electrical connector 200. This force translates into a force from the electrical connector 200 on the connector within the electronic assembly 900.

When the electrical connector assembly 10 is disconnected from the electronic assembly 900, force exerted from the compressed spring is released and the cable connector assembly may then be readily removed, without a need to unlatch electrical connector 200.

In some embodiments, first adapter o-ring 912 contributes to providing an environmental seal between flange 906 and a panel of the electronic assembly 900 (panel not shown). Second adapter o-ring 914 may contribute in providing an environmental seal between adapter 902 and coupling nut 800. Upon mating of the electrical cable connector assembly 10 and the electronic assembly 900, coupling nut 800 is screwed in place along connector slot 904 and second adapter o-ring 914 ensures that a seal is provided between the external environment and an inner portion of the coupling nut 800.

While particular embodiments have been chosen to illustrate the invention, it will be understood by those skilled in the art that various changes and modifications can be made therein without departing from the scope of the invention as defined in the appended claims.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art.

As one example, different features were discussed above in connection with different embodiments of the invention. These features may be used alone or in combination.

For example, embodiments were described for cable connector assemblies incorporating both electrical and optical connectors. These assemblies may use similar components or components that perform similar functions. It should be appreciated that techniques for construction and operation of cable connector assemblies with optical connectors may be employed for electrical connector cable assemblies and vice versa.

As another example, an electronic assembly is described as including an electrical connector attached to a printed circuit board. An electrical connector may be attached to any suitable substrate, including to a flex circuit.

As another example, a coupling nut is described as providing attachment between a cable connector assembly and an adapter. Any suitable attachment mechanism may be used. Other examples include latches, push/pull or snap connections.

Such alterations, modifications, and improvements are intended to be part of this disclosure, and are intended to be within the spirit and scope of the invention. Accordingly, the foregoing description and drawings are by way of example only.

What is claimed is:

1. A connector assembly configured to connect to an adapter, the assembly comprising:
   a connector connected to a cable;
   a coupling member having a region that is adapted to engage with the adapter;
   a biasing element coupled to the connector and the coupling member, wherein the region of the coupling member is shaped such that engagement of the coupling member with the adapter compresses the biasing element; and
   a housing having a front housing portion and a rear housing portion, wherein the front housing portion and the rear housing portion are slidably connected relative to one another and the biasing member is constructed to provide a biasing force between the front housing portion and the rear housing portion.

2. The assembly of claim 1, wherein the connector comprises an optical connector.

3. The assembly of claim 1, the assembly of claim 1, wherein the coupling member comprises a nut.

4. The assembly of claim 1, wherein the cable comprises at least one optical fiber and the assembly further comprises at least one connector, wherein each at least one optical fiber is attached to a corresponding connector.

5. The assembly of claim 1, wherein the front housing portion comprises an attachment region for holding the connector.

6. The assembly of claim 1, wherein the biasing element comprises a spring mounted on the front housing portion.

7. The assembly of claim 1, wherein the rear housing comprises a flange.

8. The assembly of claim 7, further comprising a first o-ring and a second o-ring disposed adjacent to the flange of the rear housing, the first and second o-rings providing an environmental seal about the housing.

9. The assembly of claim 7, wherein the adapter comprises a slot for engagement with the coupling member.

10. The assembly of claim 1, further comprising at least one o-ring disposed about the adapter for providing an environmental seal between the coupling member and the adapter.

11. The assembly of claim 1, wherein the front housing and the rear housing slide a distance ranging between about 0 mm and about 2 mm relative to one another.

12. A connector assembly, the assembly comprising:
a cable adapted to transmit signals;
   a front housing having a back attachment portion;
   a connector attached to the cable and coupled to the front housing;
a biasing element coupled to the front housing;
   a rear housing having an front attachment portion slidably coupled to the back attachment portion of the front housing;
   a first sealing member and a second sealing member disposed adjacent to the rear housing to provide an environmental seal about the rear housing;
   a coupling member having a region that is adapted to engage with an electronic assembly and
   wherein:
the biasing element is mounted to bias the front housing away from the rear housing.

13. The assembly of claim 12, wherein the connector comprises an optical connector or an electrical connector.

14. The assembly of claim 12, wherein the coupling member comprises a nut.

15. The assembly of claim 12, wherein the cable comprises a fiber optic cable that is split into at least two separate optical fibers.

16. The assembly of claim 12, further comprising a transceiver attached to the connector.

17. The assembly of claim 12, wherein the back attachment portion of the front housing comprises a protrusion and the front attachment portion of the rear housing comprises a slot for engagement with the protrusion.

18. The assembly of claim 12, wherein the electronic assembly comprises a slot for engagement with the coupling member.

19. The assembly of claim 12, further comprising at least one o-ring disposed about the electronic assembly for providing an environmental seal between the coupling member and the electronic assembly.

20. The assembly of claim 12, wherein the electronic assembly comprises a cage for holding a transceiver.

21. The assembly of claim 20, wherein the cage is attached to a printed circuit board.

22. The assembly of claim 20, wherein the cage comprises a transceiver opening and a cut out adjacent to the transceiver opening.

23. A cage for holding a transceiver having a protruding latching feature, the cage comprising:
a cage body having a plurality of conductive walls adjacent a transceiver opening shaped to receive the transceiver, the plurality of walls comprising a top wall, a bottom wall, a back wall and two side walls;
a bottom attachment region for attaching the cage body to a circuit board, the bottom attachment region including a plurality of attachment posts, each post extending from a wall of the plurality of walls;
an electronic assembly attachment region for attaching the cage body to the electronic assembly
wherein:
the transceiver opening has a width w1 ranging between about 10 mm and about 20 mm and a height h1 that ranges between about 6 mm and about 12 mm; and
a cut out in the bottom wall shaped and positioned to align with the protruding latching feature.

24. The cage of claim 23, wherein the bottom wall, the back wall, and the two side walls each include at least one attachment post.

25. The cage of claim 23, further comprising a side attachment region having at least one slot for engaging a portion of the transceiver therewith.

26. The cage of claim 23, wherein the electronic assembly attachment region includes at least one slot for engaging a portion of the electronic assembly therewith.

27. The cage of claim 23, wherein the width w1 of the transceiver opening ranges between about 10 mm and about 15 mm.

28. The cage of claim 23, wherein the height h1 of the transceiver opening ranges between about 6 mm and about 11 mm.

29. The cage of claim 23, wherein the width w1 of the transceiver opening ranges between about 15 mm and about 20 mm.

30. The cage of claim 23, wherein the height h1 of the transceiver opening ranges between about 7 mm and about 12 mm.

31. The cage of claim 23, wherein the width w2 of the cut out is at least 3 mm.

32. The cage of claim 31, wherein the width w2 of the cut out ranges between about 3 mm and about 6 mm.

33. The cage of claim 23, wherein the length 12 of the cut out is at least 5 mm.

34. The cage of claim 33, wherein the length 12 of the cut out ranges between about 5 mm and about 8 mm.

35. The cage of claim 23, wherein the transceiver comprises a latch, and upon insertion of the transceiver in the cage body, the latch is disposed within a space of the cut out.

36. An electronic assembly comprising the cage of claim 23, the electronic assembly further comprising:
a printed circuit board;
a panel having a panel opening; and
an adapter surrounding the panel opening,
wherein the cage is attached to the printed circuit board with the transceiver opening adjacent the panel opening.

37. A method of mating an optical fiber connector assembly with an electronic assembly, the method comprising:
inserting an optical transceiver into a panel adapter;
coupling an optical connector of an optical fiber connector assembly to the optical transceiver;
engaging a coupling member of the optical fiber connector assembly to the adapter; and
rotating the coupling member to generate a force that is transmitted through the optical connector to press the optical transceiver into mating engagement with an electrical connection member, the force being sufficient to compress a spring mounted to the optical fiber connector assembly.

38. The method of claim 37, wherein upon disconnecting the optical fiber connector assembly with the electronic assembly, rotating the coupling member in an opposite direction such that mechanical energy stored in the compressed spring is released.

39. The method of claim 37, wherein a transceiver is attached to a connector prior to insertion of the optical fiber connector assembly into the electronic assembly.

40. The method of claim 37, further comprising withdrawing the optical transceiver from the adapter, wherein the transceiver remains engaged with the optical fiber connector assembly.

* * * * *

UNITED STATES PATENT AND TRADEMARK OFFICE
CERTIFICATE OF CORRECTION

| | |
|---|---|
| PATENT NO. | : 8,272,790 B2 |
| APPLICATION NO. | : 12/625387 |
| DATED | : September 25, 2012 |
| INVENTOR(S) | : Michael Belsan et al. |

It is certified that error appears in the above-identified patent and that said Letters Patent is hereby corrected as shown below:

Claim 9, column 22, line 39, "claim 7" should read -- claim 1 --

Signed and Sealed this
Twelfth Day of February, 2013

Teresa Stanek Rea
*Acting Director of the United States Patent and Trademark Office*